US012615616B2

(12) United States Patent　(10) Patent No.: US 12,615,616 B2
Pezeshki et al.　(45) Date of Patent: Apr. 28, 2026

(54) ADAPTATION OF ARTIFICIAL INTELLIGENCE/MACHINE LEARNING MODELS BASED ON SITE-SPECIFIC DATA

(71) Applicant: QUALCOMM Incorporated, San Diego, CA (US)

(72) Inventors: Hamed Pezeshki, San Diego, CA (US); Taesang Yoo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 18/446,320

(22) Filed: Aug. 8, 2023

(65) Prior Publication Data

US 2024/0057021 A1　Feb. 15, 2024

Related U.S. Application Data

(60) Provisional application No. 63/371,205, filed on Aug. 11, 2022.

(51) Int. Cl.
*H04W 64/00*　(2009.01)
*H04W 72/044*　(2023.01)

(52) U.S. Cl.
CPC ....... *H04W 64/003* (2013.01); *H04W 72/046* (2013.01)

(58) Field of Classification Search
CPC . H04W 64/003; H04W 72/046; H04W 24/02; H04B 7/0695
See application file for complete search history.

(56) References Cited

U.S. PATENT DOCUMENTS

2021/0336683 A1　10/2021　Pezeshki et al.
2021/0376902 A1 *　12/2021　Burström ........... H04B 7/06952
(Continued)

FOREIGN PATENT DOCUMENTS

WO　2021215995 A1　10/2021

OTHER PUBLICATIONS

China Telecom, et al., "Improving Correctness by Retrieval Historical Model from ADRF", SA WG2 Meeting #152E e-meeting, S2-2205675, Elbonia, Type PCR, FS_ENA_PH3, 3rd Generation Partnership Project, Mobile Competence Centre, 650, Route Des Lucioles, F-06921 Sophia-Antipolis Cedex, France, vol. 3GPP SA 2, No. Online, Aug. 17, 2022-Aug. 26, 2022, Aug. 10, 2022, XP052184077, 3 Pages, Chapters 1, 2.

(Continued)

*Primary Examiner* — Kenneth T Lam
(74) *Attorney, Agent, or Firm* — Polsinelli LLP

(57)　ABSTRACT

Systems and techniques for wireless communications are described herein. For example, a process for wireless communications at a first network entity include obtaining site-specific data associated with a geographic location and adapting, at the first network entity, a machine learning model based on the site-specific data to generate an updated machine learning model for estimating or predicting of at least one characteristic associated with wireless communications between the first network entity and one or more network entities. The first network entity can experience a trigger event which causes the first network entity to transmit a request for the site-specific data. The triggering event can be based on at least one of a location of the first network entity in the geographic location or the first network entity moving to the geographic location or based on other factors such as a change in a physical characteristic of the location.

27 Claims, 12 Drawing Sheets

700

OBTAIN SITE-SPECIFIC DATA ASSOCIATED WITH A GEOGRAPHIC LOCATION
702

ADAPT, AT A NETWORK ENTITY, A MACHINE LEARNING MODEL BASED ON THE SITE-SPECIFIC DATA TO GENERATE AN UPDATED MACHINE LEARNING MODEL FOR ESTIMATING OR PREDICTING AT LEAST ONE CHARACTERISTIC ASSOCIATED WITH WIRELESS COMMUNICATION BETWEEN THE NETWORK ENTITY AND OTHER NETWORK ENTITIES
704

TRANSMIT AN INDICATION ASSOCIATED WITH ADAPTING THE MACHINE LEARNING MODEL BASED ON THE SITE-SPECIFIC DATA
706

(56)                    References Cited

U.S. PATENT DOCUMENTS

| | | | | |
|---|---|---|---|---|
| 2022/0256364 A1* | 8/2022 | Jat | .......................... | H04W 16/22 |
| 2023/0109947 A1* | 4/2023 | Parkvall | ............ | H04W 52/0229 |
| | | | | 455/418 |
| 2023/0115368 A1* | 4/2023 | Parichehrehteroujeni | ................... | |
| | | | | H04W 74/0833 |
| | | | | 706/46 |
| 2025/0056488 A1* | 2/2025 | Alawieh | ............... | G01S 5/0278 |

OTHER PUBLICATIONS

International Search Report and Written Opinion—PCT/US2023/071926—ISA/EPO—Dec. 14, 2023.

* cited by examiner

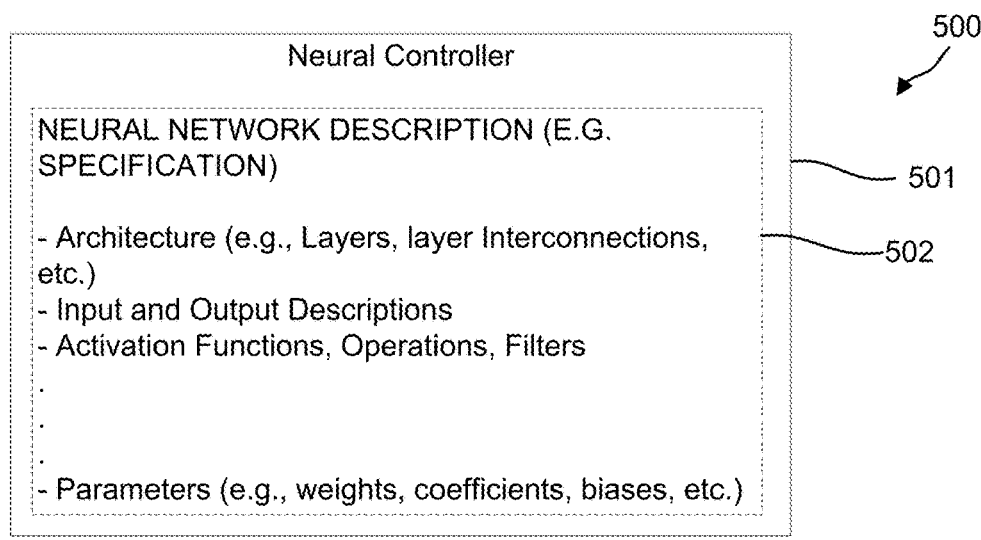
Neural Controller
NEURAL NETWORK DESCRIPTION (E.G. SPECIFICATION)
- Architecture (e.g., Layers, layer Interconnections, etc.)
- Input and Output Descriptions
- Activation Functions, Operations, Filters
.
.
.
- Parameters (e.g., weights, coefficients, biases, etc.)
— 501
—502
500
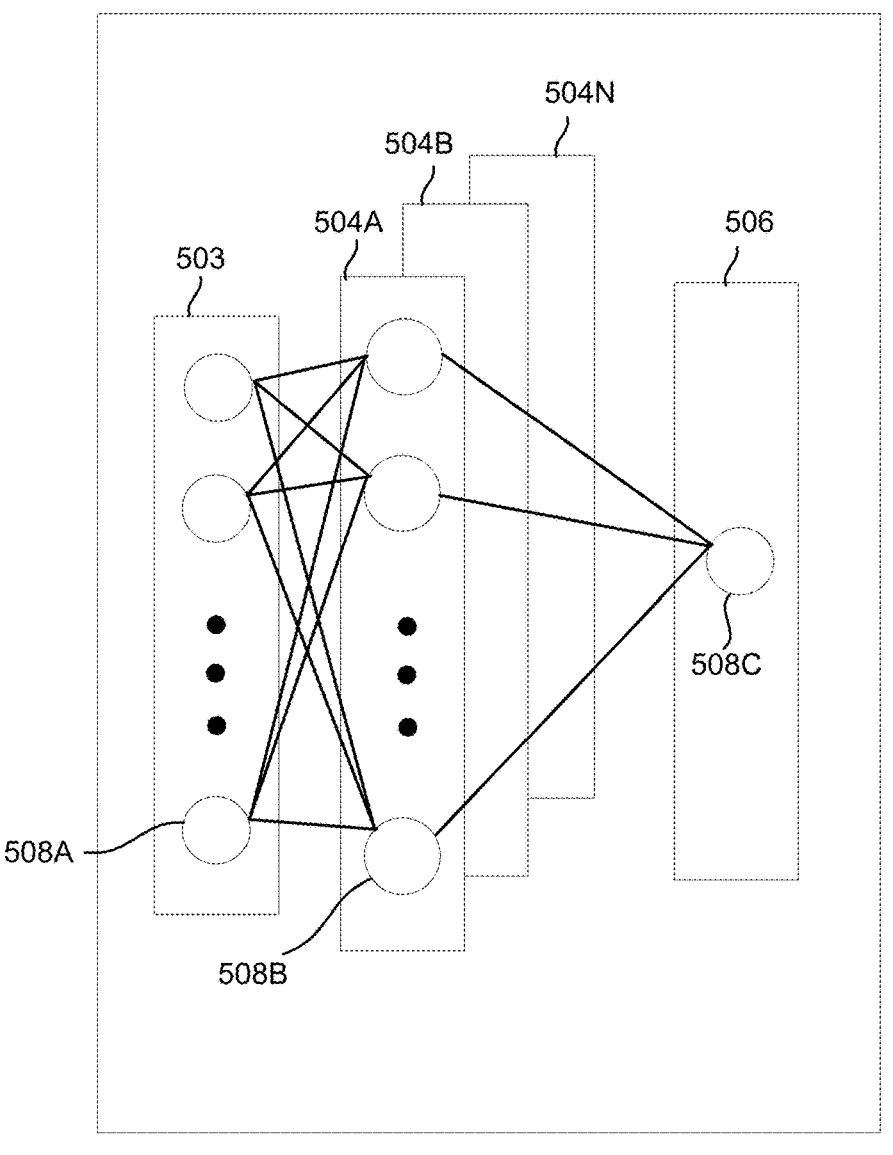
FIG. 5

700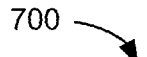

OBTAIN SITE-SPECIFIC DATA ASSOCIATED WITH A
GEOGRAPHIC LOCATION
702

ADAPT, AT A NETWORK ENTITY, A MACHINE
LEARNING MODEL BASED ON THE SITE-SPECIFIC
DATA TO GENERATE AN UPDATED MACHINE
LEARNING MODEL FOR ESTIMATING OR PREDICTING
AT LEAST ONE CHARACTERISTIC ASSOCIATED WITH
WIRELESS COMMUNICATION BETWEEN THE
NETWORK ENTITY AND OTHER NETWORK ENTITIES
704

TRANSMIT AN INDICATION ASSOCIATED WITH
ADAPTING THE MACHINE LEARNING MODEL BASED
ON THE SITE-SPECIFIC DATA
706

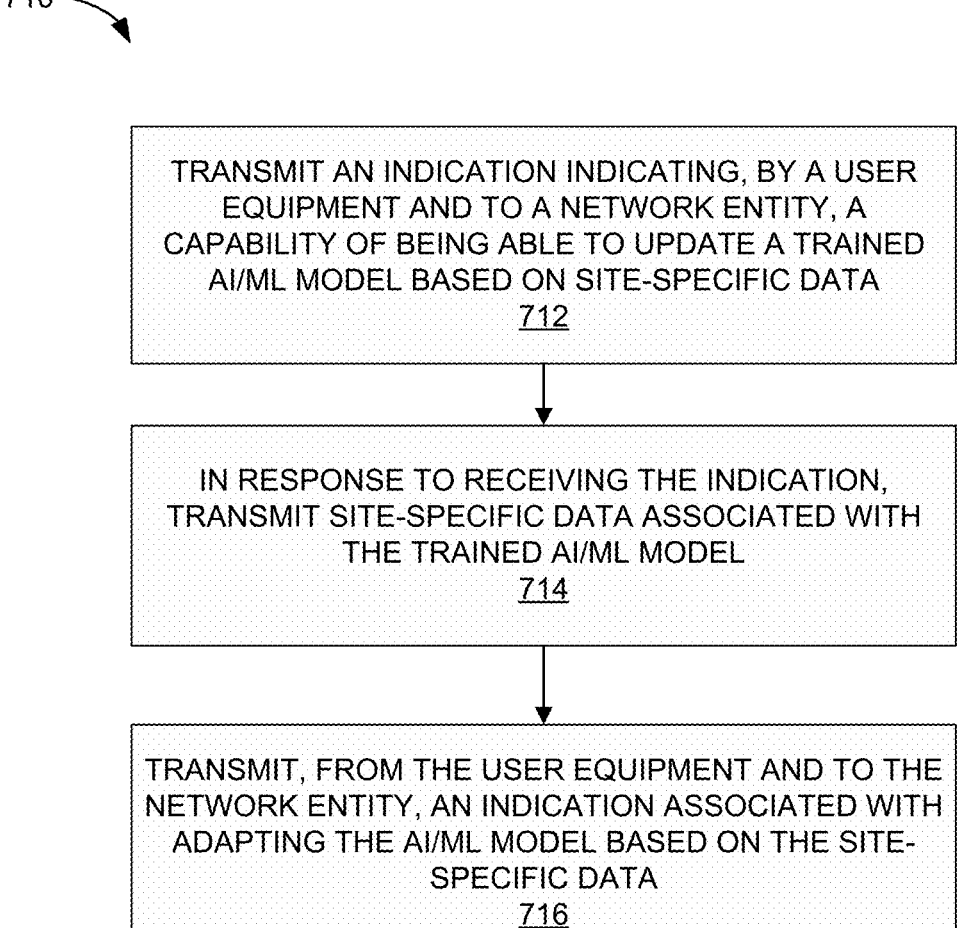

TRANSMIT AN INDICATION INDICATING, BY A USER EQUIPMENT AND TO A NETWORK ENTITY, A CAPABILITY OF BEING ABLE TO UPDATE A TRAINED AI/ML MODEL BASED ON SITE-SPECIFIC DATA
712

IN RESPONSE TO RECEIVING THE INDICATION, TRANSMIT SITE-SPECIFIC DATA ASSOCIATED WITH THE TRAINED AI/ML MODEL
714

TRANSMIT, FROM THE USER EQUIPMENT AND TO THE NETWORK ENTITY, AN INDICATION ASSOCIATED WITH ADAPTING THE AI/ML MODEL BASED ON THE SITE-SPECIFIC DATA
716

FIG. 7B

800

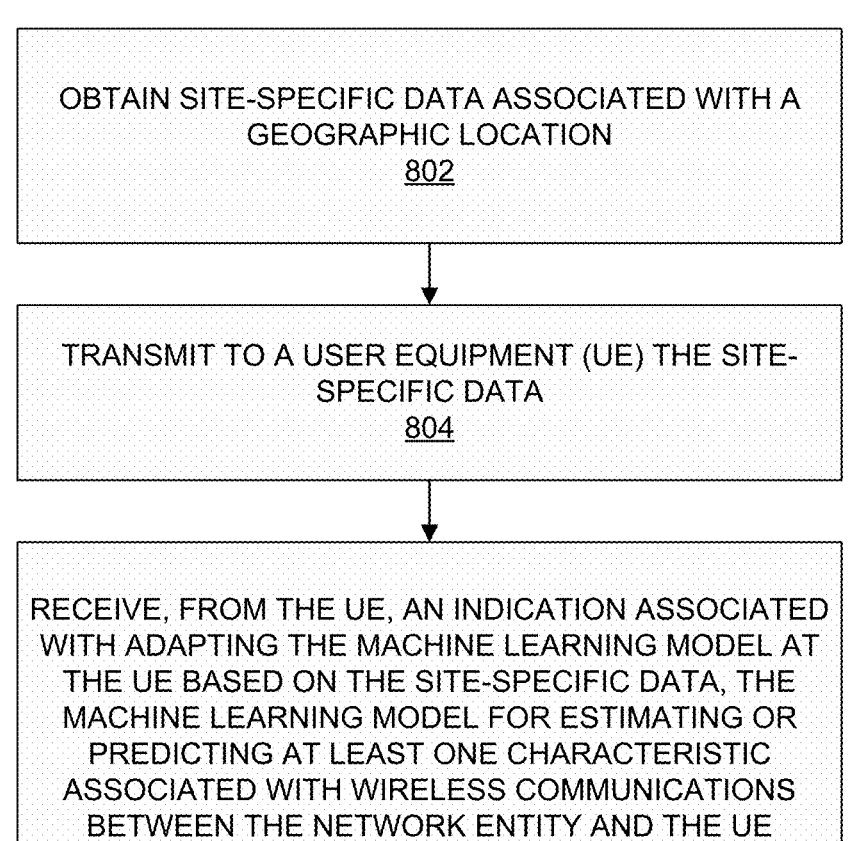

OBTAIN SITE-SPECIFIC DATA ASSOCIATED WITH A
GEOGRAPHIC LOCATION
<u>802</u>

TRANSMIT TO A USER EQUIPMENT (UE) THE SITE-
SPECIFIC DATA
<u>804</u>

RECEIVE, FROM THE UE, AN INDICATION ASSOCIATED
WITH ADAPTING THE MACHINE LEARNING MODEL AT
THE UE BASED ON THE SITE-SPECIFIC DATA, THE
MACHINE LEARNING MODEL FOR ESTIMATING OR
PREDICTING AT LEAST ONE CHARACTERISTIC
ASSOCIATED WITH WIRELESS COMMUNICATIONS
BETWEEN THE NETWORK ENTITY AND THE UE
<u>806</u>

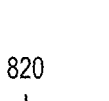

OBTAIN, AT A USER EQUIPMENT (UE) AND FROM A
NETWORK ENTITY, SITE-SPECIFIC DATA ASSOCIATED
WITH A GEOGRAPHIC LOCATION
812

ADAPT, AT A USER EQUIPMENT (UE), A MACHINE
LEARNING MODEL BASED ON THE SITE-SPECIFIC
DATA TO GENERATE AN UPDATED MACHINE
LEARNING MODEL FOR ESTIMATING OR PREDICTING
AT LEAST ONE  CHARACTERISTIC ASSOCIATED WITH
WIRELESS COMMUNICATION BETWEEN THE UE AND
THE NETWORK ENTITY
814

FIG. 8B

ADAPTATION OF ARTIFICIAL INTELLIGENCE/MACHINE LEARNING MODELS BASED ON SITE-SPECIFIC DATA

CROSS-REFERENCE TO RELATED APPLICATIONS

This application claims the benefit of U.S. Provisional Application No. 63/371,205, filed Aug. 11, 2022, which is hereby incorporated by reference, in its entirety and for all purposes.

FIELD

The present disclosure generally relates to machine learning (ML) systems for wireless communications. For example, aspects of the present disclosure relate to systems and techniques for adapting artificial intelligence/machine learning models implemented by a user equipment (UE) based on site-specific data.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second of bandwidth to tens of workers on an office floor. Several hundreds of thousands of simultaneous connections should be supported in order to support large sensor deployments.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described herein for adapting (e.g., via online adaption or fine-tuning) artificial intelligence/machine learning models implemented by a user equipment (UE) based on site-specific data (e.g., data corresponding to a geographic location in which the UE is located). In some cases, the UE may receive or download the site-specific data based on a triggering condition. Once site-specific data is obtained, the UE may use the site-specific data to fine-tune an artificial intelligence/machine learning model on the UE. The apparatus, method, and other aspects described herein can be described from a standpoint of a base station (or portion thereof, such as a central unit (CU), a distributed unit (DU), a radio unit (RU), or other portion of a base station having a disaggregated architecture), UE, other network entity or device, or combination of devices.

In one illustrative example, an apparatus for wireless communications is provided that includes at least one memory and at least one processor (e.g., implemented in circuitry) coupled to the at least one memory and configured to: obtain site-specific data associated with a geographic location; adapt a machine learning model based on the site-specific data to generate an updated machine learning model for estimating or predicting at least one characteristic associated with wireless communications between the apparatus and one or more network entities and transmit an indication associated with adapting the machine learning model based on the site-specific data. In one example, the apparatus is a first network entity, such as a user equipment.

In another example, a method for wireless communications at a first network entity is provided. The method includes obtaining site-specific data associated with a geographic location, adapting, at the first network entity, a machine learning model based on the site-specific data to generate an updated machine learning model for estimating or predicting at least one characteristic associated with wireless communications between the first network entity and one or more network entities and transmitting an indication associated with adapting the machine learning model based on the site-specific data. The method can be performed in one example by a user equipment.

The first network entity can be located in the geographic location. The method can include determining, at the first network entity using the updated machine learning model, one or more estimations or predictions of the at least one characteristic associated with wireless communications between the first network entity and one or more network entities based on data received by the first network entity at the geographic location.

The method can further include transmitting, from the first network entity to a second network entity, a request for the site-specific data. Transmitting the request for the site-specific data can be triggered based on at least one of a location of the first network entity in the geographic location or the first network entity moving to the geographic location.

An apparatus and method can also be described from the standpoint of an apparatus such as a base station (e.g., a gNB, which stands for a next generation node B. The gNB is a 3GPP 5G Next Generation base station which supports the 5G New Radio). An apparatus for wireless communication can include at least one memory and at least one processor coupled to the memory and configured to obtain site-specific data associated with a geographic location and transmit, to a network entity such as a UE or mobile device, the site-specific data.

A method can include obtaining, at a first network entity, site-specific data associated with a geographic location and transmitting, from the first network entity and to a second network entity, the site-specific data, wherein a machine learning model is adapted based on the site-specific data for estimating or predicting at least one characteristic associated with wireless communications between the first network entity and one or more network entities.

A method of wireless communications can include one or more of: indicating, by a user equipment and to a network entity, a capability of being able to update a trained artificial intelligence/machine learning (AI/ML) model, in response to the indicating, transmitting site-specific data associated with the trained AI/ML model, and transmitting, from the user equipment and to the network entity, an indication associated with adapting the AI/ML model based on the site-specific data.

An apparatus for wireless communication can include: at least one memory; and at least one processor coupled to the memory and configured to: indicate, to a network entity, a capability of being able to update a trained AI/ML model, in response to the indicating, transmit site-specific data associated with the trained AI/ML model, and transmit, to the network entity, an indication associated with adapting the AI/ML model based on the site-specific data.

A non-transitory computer-readable storage medium comprising instructions stored thereon which, when executed by at least one processor, causes the at least one processor to perform operations according to any of the methods, operations or processes disclosed herein. An apparatus for wireless communications can include one or more means for performing operations according to any of the methods, operations or processes disclosed herein.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIG. 5 illustrates an example architecture of a neural network that may be used in accordance with some aspects of the present disclosure;

FIG. 7A is a flow diagram illustrating a process of transmitting site-specific data to a user equipment for use by the user equipment to fine-tune an artificial intelligence/machine learning (AI/ML) model, in accordance with some examples;

FIG. 7B is a flow diagram illustrating a process of transmitting site-specific data to fine tune an AI/ML model, in accordance with some examples;

FIG. 8A is a flow diagram illustrating a process of transmitting site-specific data to the user equipment for fine-tuning an AI/ML model, in accordance with some examples;

FIG. 8B is a flow diagram illustrating a process of receiving site-specific data at the user equipment for adapting an AI/ML model, in accordance with some examples;

DETAILED DESCRIPTION

Figure 1:
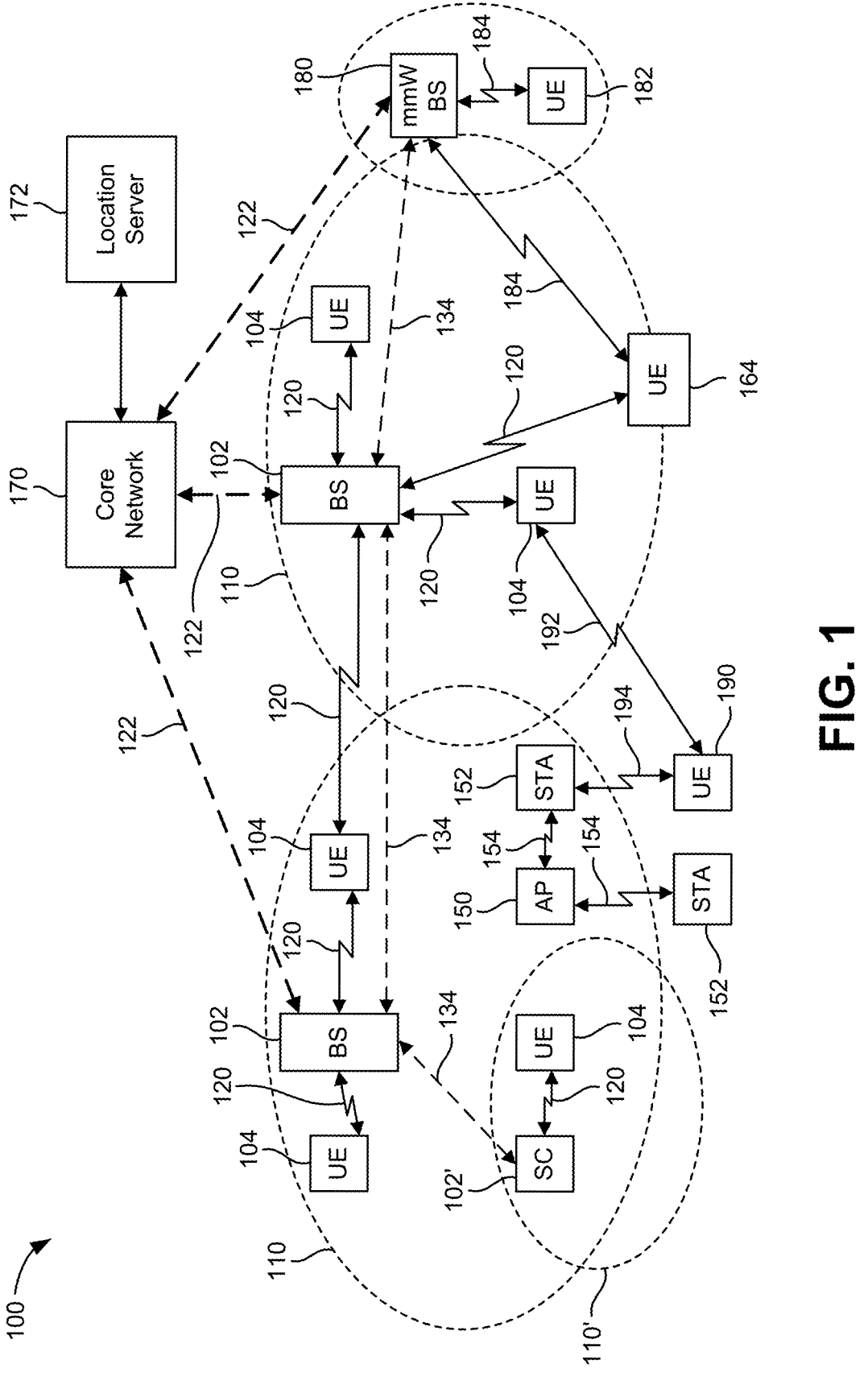
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Various aspects are provided herein with reference to wireless technologies (e.g., The 3$^{rd}$ Generation Partnership Project (3GPP) 5G/New Radio (NR) Standard) to provide improvements to wireless communications. As noted above, systems and techniques are described herein for adapting (e.g., via online adaption or fine-tuning) artificial intelligence/machine learning (ML) models implemented by a user equipment (UE) based on site-specific data (e.g., data corresponding to a geographic location in which the UE is located). In some cases, the UE may receive, download, or collect (e.g., locally at the geographic location) the site-specific data based on a triggering condition. The triggering condition can be, for example, the UE moving into a new geographic area where data associated with the geographic area would be helpful to adapt or fine-tune an ML model implemented on the UE that is configured to (e.g., trained using supervised learning, unsupervised learning, semi-supervised learning, or other learning/training) estimate or predict at least one characteristic associated with wireless communications between the UE and one or more network entities (e.g., a base station or portion thereof, such as a CU, DU, etc.). Once site-specific data is obtained, the UE may use the site-specific data to fine-tune the ML model on the UE. The at least one characteristic for which the ML model is trained to estimate or predict can include temporal beam predictions, spatial beam predictions, positioning-assisted beam predictions, channel state predictions (e.g., for channel state information (CSI) or channel state feedback (CSF)), any combination thereof, and/or other predictions.

Additional aspects of the present disclosure are described in more detail below with respect to the figures.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a "Uu interface", also known as the Universal Mobile Telecommunications System (UMTS) air interface. In some cases, an access link may support uplink signaling, downlink signaling, connection procedures, etc.

In some aspects, wireless communication networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which the base station is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems the base station may provide additional control and/or network management functions. A communication link through which UEs may send signals to a base station may be referred to as an uplink (UL) channel (e.g., a reverse traffic channel, a reverse control channel, an access channel, etc.). A communication link through which the base station may send signals to UEs may be referred to as a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity"

or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communication system 100. The wireless communication system 100 (which may also be referred to as a wireless wide area network (WWAN)) may include a base station or base stations 102 (reference number 102 can refer to a single base station or a plurality of base stations) and a UE or UEs 104 (reference number 104 can refer to a single UE or a plurality of UEs). In some aspects, the base stations 102 may also be referred to as "network entities" or "network nodes." The UE or UEs 104 may also be referred to as "network entities" or "network nodes". One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs (e.g., an eNB can be a base station connected to the network that communicate wirelessly with mobile handsets in a 4G LTE network or 5G non-standalone (NSA) mode) and/or ng-eNBs (e.g, an ng-eNB can be an enhanced version of 4G eNodeB) where the wireless communication system 100 corresponds to a long-term evolution (LTE) network, or gNBs where the wireless communication system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location server(s) 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station of the base stations 102 in each respective geographic coverage area 110. A "cell" is a logical communication entity used for communication with a base station 102 (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs 104. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of the respective geographic coverage area 110.

While neighboring macro cell base station of the base stations 102 respective geographic coverage area 110 may partially overlap (e.g., in a handover region), some of the respective geographic coverage area 110 may be substantially overlapped by a larger respective geographic coverage area 110. For example, a small cell (SC) base station 102' may have a coverage area 110' that substantially overlaps with the respective geographic coverage area 110 of one or more macro cell base stations of the base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE of the UEs 104 to a base station of the base stations 102 and/or downlink (also referred to as forward link) transmissions from a base station of the base stations 102 to a UE of the UEs 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communication system 100 may further include a WLAN access point (AP) 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communication system 100 may include devices (e.g., UEs, etc.) that communicate with one or more UE of the UEs 104, base stations 102, WLAN AP 150, etc. utilizing the ultra-wideband (UWB) spectrum. The UWB spectrum may range from 3.1 to 10.5 GHz, or may include spectrum outside of these ranges.

The SC base station 102' may operate in a licensed and/or an unlicensed frequency spectrum. When operating in an unlicensed frequency spectrum, the SC base station 102' may employ LTE or NR technology and use the same 5 GHz unlicensed frequency spectrum as used by the WLAN AP 150. The SC base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communication system 100 may further include a millimeter wave (mmW) base station 180 that may operate in mmW frequencies and/or near mmW frequencies in communication with a UE 182 via a mmW communication link 184. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in the 30 GHz to 300 GHz band may be referred to as millimeter waves. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more of the base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE of the UEs 104/182 and the cell in which the UE of the UEs 104/182 either performs the initial radio resource control (RRC) connection establishment procedure or initiates the RRC connection re-establishment procedure. The primary carrier carries all common and UE-specific control channels and may in some cases be a carrier in a licensed. A secondary carrier is a carrier operating on a second frequency (e.g., FR2) that may be configured once the RRC connection is established between the UE of the UEs 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. Different UEs 104/182 in a cell may have different downlink primary carriers. The same is true for the uplink primary carriers. The network is able to change the primary carrier of any UE of the UEs 104/182 at any time. Changing the primary carrier is performed, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations of the base stations 102 may be an anchor carrier (or "PCell") and other frequencies utilized by the macro cell base stations of the base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE of the UEs 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station of the base stations 102 and/or a UE of the UEs 104 may be equipped with multiple receivers and/or transmitters. For example, a UE of the UEs 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tunable to band 'Z' only. In one example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE of the UEs 104 is being served in band 'X' or band 'Y,' because of the separate "Receiver 2," the UE of the UEs 104 may measure band 'Z' without interrupting the service on band 'X' or band 'Y.'

The wireless communication system 100 may further include a UE 164 that may communicate with a macro cell base station of the base stations 102 over a communication link 120 and/or the mmW base station 180 over an mmW communication link 184. For example, the macro cell base station of the base stations 102 may support a PCell and one or more SCells for the UE 164 and the mmW base station 180 may support one or more SCells for the UE 164.

The wireless communication system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with a WLAN STA of the WLAN STAs 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
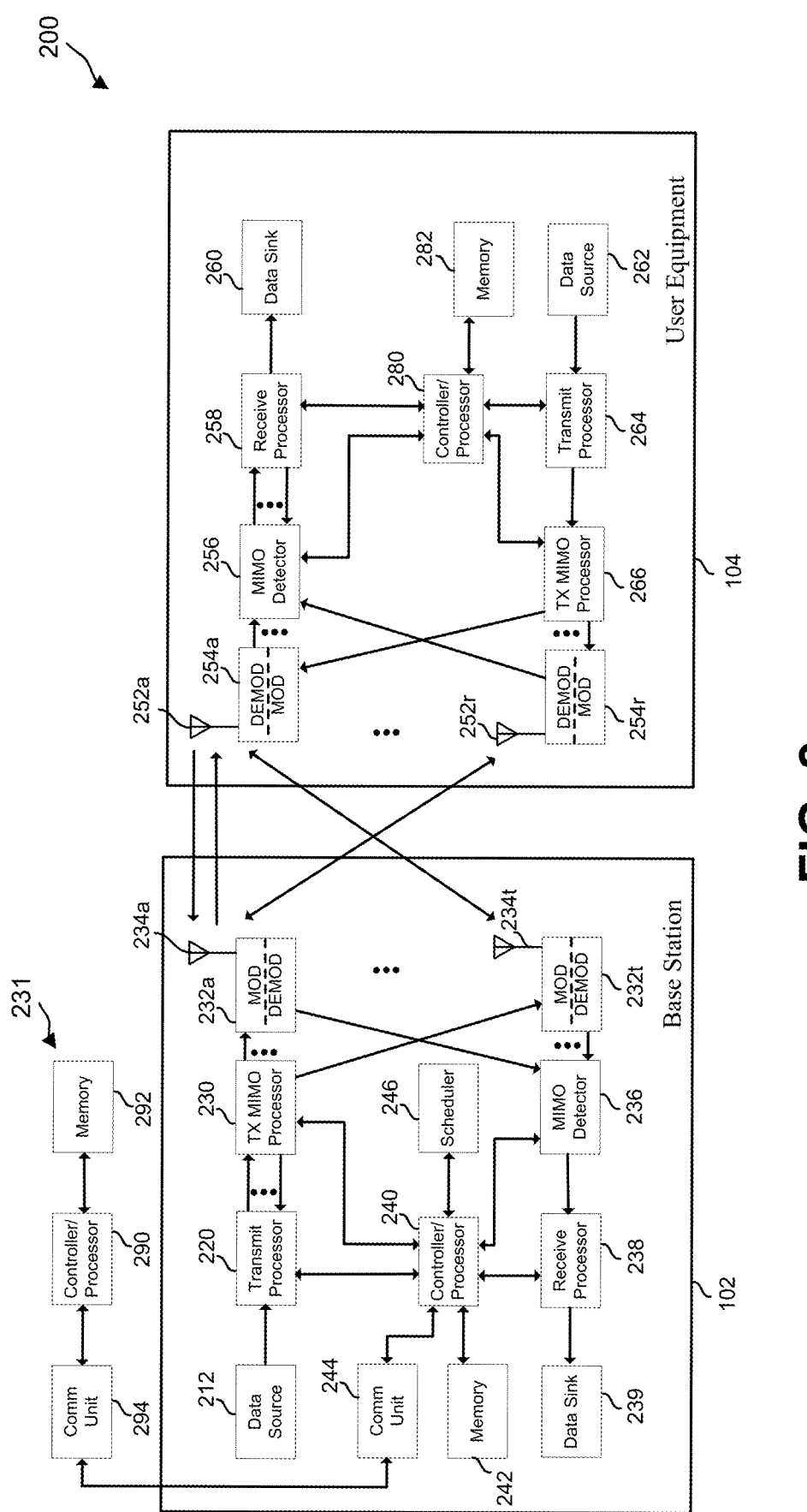
FIG. 2 is a diagram illustrating a design of a base station and a User Equipment (UE) device that enable transmission and processing of signals exchanged between the UE and the base station, in accordance with some examples.

FIG. 2 shows a block diagram of a system 200 of a base station of the base stations 102 and a UE of the UEs 104 that enable transmission and processing of signals exchanged between the UE 104 and the base station 102, in accordance with some aspects of the present disclosure. The system 200 includes components of a base station of the base stations 102 and a UE of the UEs 104, which may be one of the base stations 102 and one of the UEs 104 in FIG. 1. A base station of the base stations 102 may be equipped with T antennas 234a through 234t, and a UE of the UEs 104 may be equipped with R antennas 252a through 252r, where in general T≥1 and R≥1.

At a base station of the base stations 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from the modulators 232a to 232t via T antennas 234a through 234t, respectively. According to certain aspects described in more detail below, the synchronization signals may be generated with location encoding to convey additional information.

At UE of the UEs 104, R antennas 252a through 252r may receive the downlink signals from a base station of the base stations 102 and/or other base stations and may provide received signals to demodulators 254a through 254r, respectively. There may be R demodulators 254a through 254r. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate and decode) the detected symbols, provide decoded data for a UE of the UEs 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at a UE of the UEs 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station of the base stations 102. At the base station of the base stations 102, the uplink signals from a UE of the UEs 104 and other UEs may be received by T antennas 234a through 234t, processed by the modulators 232a through 232t (e.g., which can be acting as demodulators), detected by a MIMO detector 236 if applicable, and further processed by a receive processor 238 to obtain decoded data and control information sent by a UE of the UEs 104. Receive processor 238 may provide the decoded data to a data sink 239 and the decoded control information to controller 240 (which can also be referred to as a processor). A base station of the base stations 102 may include communication unit 244 and communicate to a network controller 231 via communication unit 244. Network controller 231 may include communication unit 294, controller/processor 290, and memory 292.

In some aspects, one or more components of a UE of the UEs 104 may be included in a housing. Controller 240 of a base station of the base stations 102, controller/processor 280 of a UE of the UEs 104, and/or any other component(s) of FIG. 2 may perform one or more techniques associated with implicit UCI beta value determination for NR.

Memories 242 and 282 may store data and program codes for the base station of the base stations 102 and the UE of the UEs 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
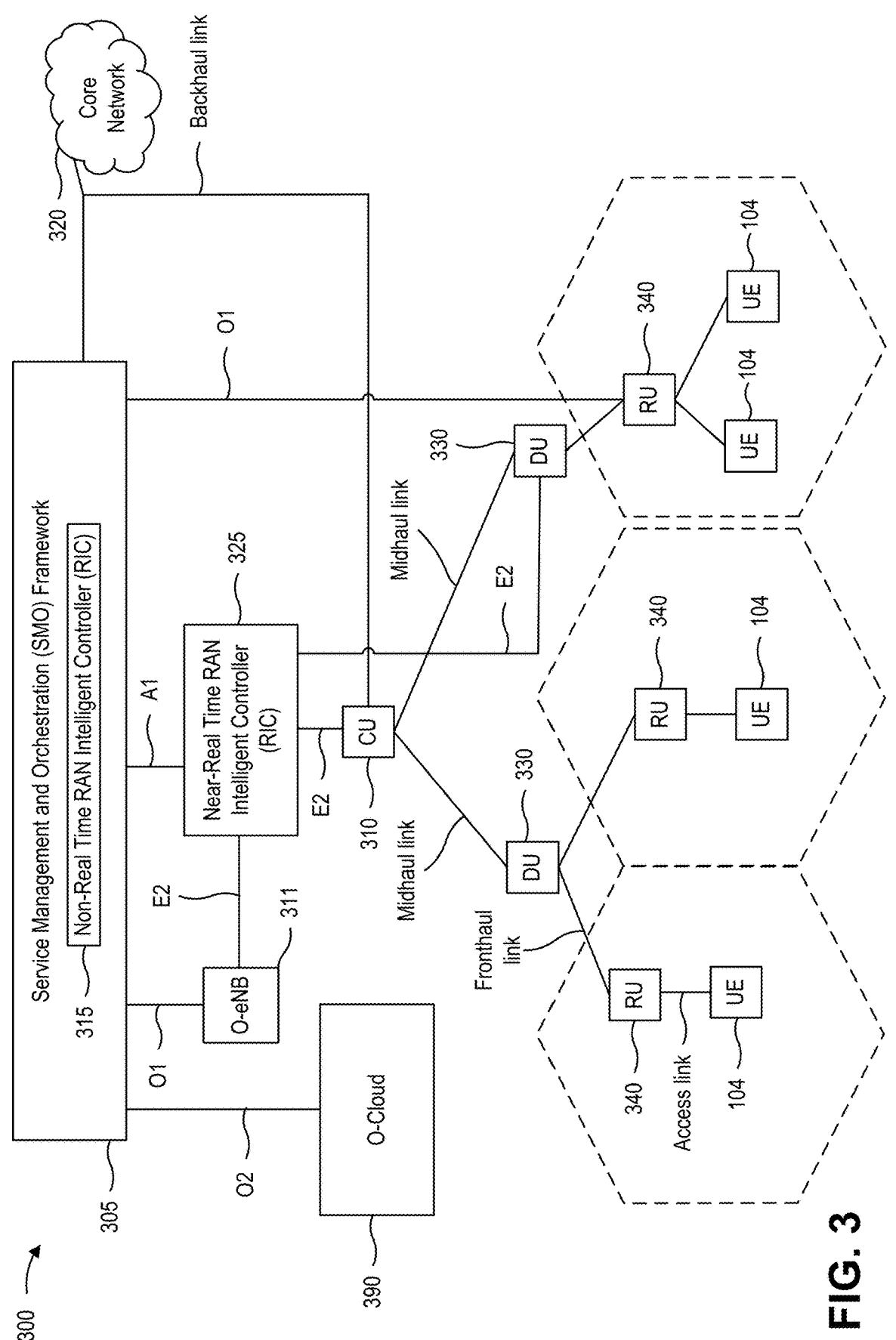
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central unit (CU) 310 that may communicate directly with a core network 320 via a backhaul link, or indirectly with the core network 320 through one or more disaggregated base station units (such as a Near-Real Time (Near-RT) RAN Intelligent Controller (RIC) or Near-RT RIC 325 via an E2 link, or a Non-Real Time (Non-RT) RIC 315 associated with a Service Management and Orchestration (SMO) Framework 305, or both). The one or more CU 310 may communicate with one or more distributed units (DU) 330 via respective midhaul links, such as an F1 interface. The one or more DU 330 may communicate with one or more radio units (RU) 340 via respective fronthaul links. The one or more RU 340 may communicate with respective UEs 104 via one or more radio frequency (RF) access links. In some implementations, the UE of the UEs 104 may be simultaneously served by multiple Rus of the one or more RU 340.

Each of the units, e.g., the one or more CU 310, the one or more DU 330, the one or more RU 340, as well as the Near-RT RICs 325, the Non-RT RIC 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the one or more CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the one or more CU 310. The one or more CU 310 may be configured to handle user plane functionality (i.e., Central Unit-User Plane (CU-UP)), control plane functionality (i.e., Central Unit-Control Plane (CU-CP)), or a combination thereof. In some implementations, the one or more CU 310 may be logically split into one or more CU-UP units and one or more CU-CP units. The CU-UP unit may communicate bidirectionally with the CU-CP unit via an interface, such as the E1 interface when implemented in an O-RAN configuration. The one or more CU 310 may be implemented to communicate with the one or more DU 330, as necessary, for network control and signaling.

The one or more DU 330 may correspond to a logical unit that includes one or more base station functions to control the operation of the one or more RU 340. In some aspects, the one or more DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the one or more DU 330 may further host one or more low PHY layers. Each layer (or module) may be implemented with an interface configured to communicate signals with other layers (and modules) hosted by the one or more DU 330, or with the control functions hosted by the one or more CU 310.

Lower-layer functionality may be implemented by one or more RU 340. In some deployments, an RU of the one or more RU 340, controlled by one or more DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the one or more RU 340 may be implemented to handle over the air (OTA) communication with one or more UE of the UEs 104. In some implementations, real-time and non-real-time aspects of control and user plane communication with the one or more RU 340 may be controlled by the corresponding one or more DU 330. In some scenarios, a configuration may enable the one or more DU 330 and the one or more CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, the one or more CU 310, one or more DU 330, the one or more RU 340 and a Near-RT RIC 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RU 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more one or more CU 310, one or more DU 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
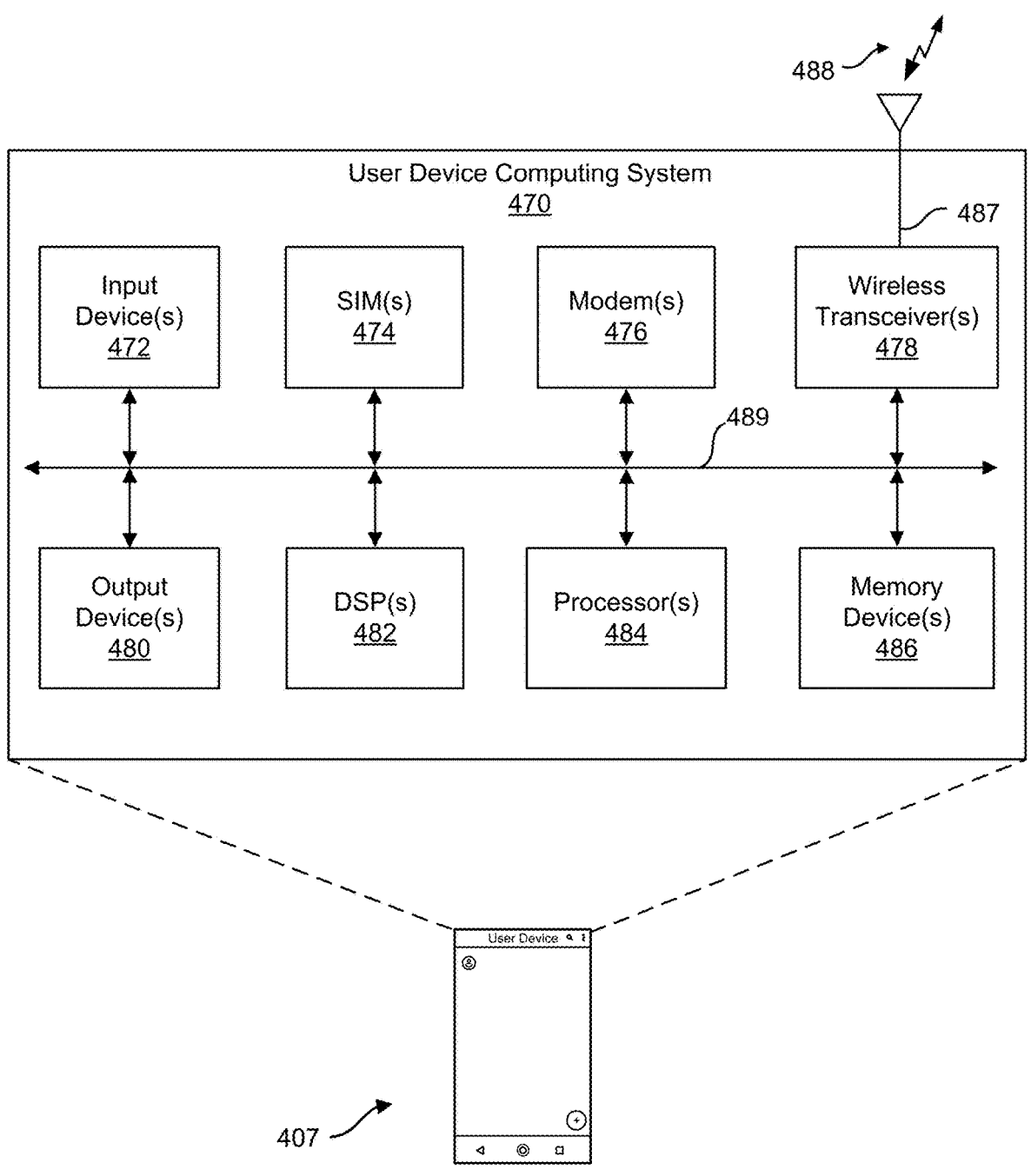
FIG. 4 is a block diagram illustrating components of a user equipment, in accordance with some examples.

FIG. 4 illustrates an example of a computing system 470 of a wireless device 407. The wireless device 407 may include a client device such as a UE (e.g., a UE of the UEs 104, WLAN STAs 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processor 484. The one or more processor 484 may include one or more CPUs, ASICs, FPGAs, APs, GPUs, VPUs, NSPs, microcontrollers, dedicated hardware, any combination thereof, and/or other processing device or system. The bus 489 may be used by the one or more processor 484 to communicate between cores and/or with the one or more memory device 486.

The computing system 470 may also include one or more memory device 486, one or more digital signal processor (DSP) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as the one or more modems 476, one or more wireless transceiver 478, and/or antennas 487. The one or more wireless transceiver 478 may transmit and receive wireless signals (e.g., wireless signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). The one or more wireless transceiver 478 may be configured to transmit RF signals for performing sidelink communications via antenna 487 in accordance with one or more transmit power parameters that may be associated with one or more regulation modes. The one or more wireless transceiver 478 may also be configured to receive sidelink communication signals having different signal parameters from other wireless devices.

In some examples, the one or more wireless transceiver 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signal 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceiver 478. In some cases, the computing system 470 may include an encryption-decryption device or component configured to encrypt and/or decrypt data (e.g., according to the AES and/or DES standard) transmitted and/or received by the one or more wireless transceiver 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceiver 478. The one or more modems 476 may also demodulate signals received by the one or more wireless transceiver 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceiver 478 may be used for communicating data for the one or more SIMs 474.

The computing system 470 may also include (and/or be in communication with) one or more non-transitory machine-readable storage media or storage devices (e.g., one or more memory device 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in one or more memory device 486 and executed by the one or more processor 484 and/or the one or more DSP 482. The computing system 470 may also include software elements (e.g., located within the one or more memory device 486), including, for example, an operating system, device drivers, executable libraries, and/or other code, such as one or more application programs, which may comprise computer programs implementing the functions provided by various embodiments, and/or may be designed to implement methods and/or configure systems, as described herein.

FIG. 5 illustrates an example architecture of a neural network 500 that may be used in accordance with some aspects of the present disclosure. The example architecture of the neural network 500 may be defined by an example neural network description 502 in neural controller 501. The neural network 500 is an example of a machine learning model that can be deployed and implemented at the base station of the base stations 102, the central unit (CU) or one or more CU 310, the distributed unit (DU) or one or more DU 330, the radio unit (RU) or one or more RU 340, and/or the UE of the UEs 104. The neural network 500 can be a feedforward neural network or any other known or to-be-developed neural network or machine learning model.

The neural network description 502 can include a full specification of the neural network 500, including the neural architecture shown in FIG. 5. For example, the neural network description 502 can include a description or specification of architecture of the neural network 500 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc. and so forth.

The neural network 500 can reflect the neural architecture defined in the neural network description 502. The neural network 500 can include any suitable neural or deep learning type of network. In some cases, the neural network 500 can include a feed-forward neural network. In other cases, the neural network 500 can include a recurrent neural network, which can have loops that allow information to be carried across nodes while reading in input. The neural network 500 can include any other suitable neural network or machine learning model. One example includes a convolutional neural network (CNN), which includes an input layer and an output layer, with multiple hidden layers between the input and out layers. The hidden layers of a CNN include a series of hidden layers as described below, such as convolutional, nonlinear, pooling (for downsampling), and fully connected layers. In other examples, the neural network 500 can represent any other neural or deep learning network, such as an autoencoder, a deep belief nets (DBNs), a recurrent neural network (RNN), etc.

In the non-limiting example of FIG. 5, the neural network 500 includes an input layer 503, which can receive one or more sets of input data. The input data can be any type of data (e.g., image data, video data, network parameter data, user data, etc.). The neural network 500 can include hidden layers 504 including a first hidden layer 504A through a last hidden layer 504N. The hidden layers 504 can include n number of hidden layers, where n is an integer greater than or equal to one. The n number of hidden layers can include as many layers as needed for a desired processing outcome and/or rendering intent. In one illustrative example, any one of the hidden layers 504 can include data representing one or more of the data provided at the input layer 503. The neural network 500 further includes an output layer 506 that provides an output resulting from the processing performed by hidden layers 504. The output layer 506 can provide output data based on the input data.

In the example of FIG. 5, the neural network 500 is a multi-layer neural network of interconnected nodes. Each node can represent a piece of information. Information associated with the nodes is shared among the different layers and each layer retains information as information is processed. Information can be exchanged between the nodes through node-to-node interconnections between the various layers. The nodes of the input layer 503 can activate a set of nodes in the first hidden layer 504A. For example, as shown, each input node of the input layer 503 is connected to each node of the first hidden layer 504A. The nodes of the first hidden layer 504A can transform the information of each input node by applying activation functions to the information. The information derived from the transformation can then be passed to and can activate the nodes of the next hidden layer (e.g., i.e., a next hidden layer 504B), which can perform their own designated functions. Example functions include convolutional, up-sampling, data transformation, pooling, and/or any other suitable functions. The output of hidden layer (e.g., the next hidden layer 504B) can then activate nodes of the next hidden layer (e.g., the last hidden layer 504N), and so on. The output of last hidden layer can activate one or more nodes of the output layer 506, at which point an output can be provided. In some cases, while nodes (e.g., nodes 508A, 508B, 508C) in the neural network 500 are shown as having multiple output lines, a node can have a single output and all lines shown as being output from a node can represent the same output value.

In some cases, each node or interconnection between nodes can have a weight that is a set of parameters derived from training the neural network 500. For example, an interconnection between nodes can represent a piece of information learned about the interconnected nodes. The interconnection can have a numeric weight that can be tuned (e.g., based on a training data set), allowing the neural network 500 to be adaptive to inputs and able to learn as more data is processed.

The neural network 500 can be pre-trained to process the features from the data in the input layer 503 using different hidden layers 504 in order to provide the output through the output layer 506. For example, in some cases, the neural network 500 can adjust weights of nodes using a training process referred to as backpropagation. Backpropagation can include a forward pass, a loss function, a backward pass, and a weight update. The forward pass, loss function, backward pass, and parameter update can be performed for one training iteration. The process can be repeated for a certain number of iterations for each set of training data until the weights of the layers are accurately tuned (e.g., meet a configurable threshold determined based on experiments and/or empirical studies).

Figure 6:
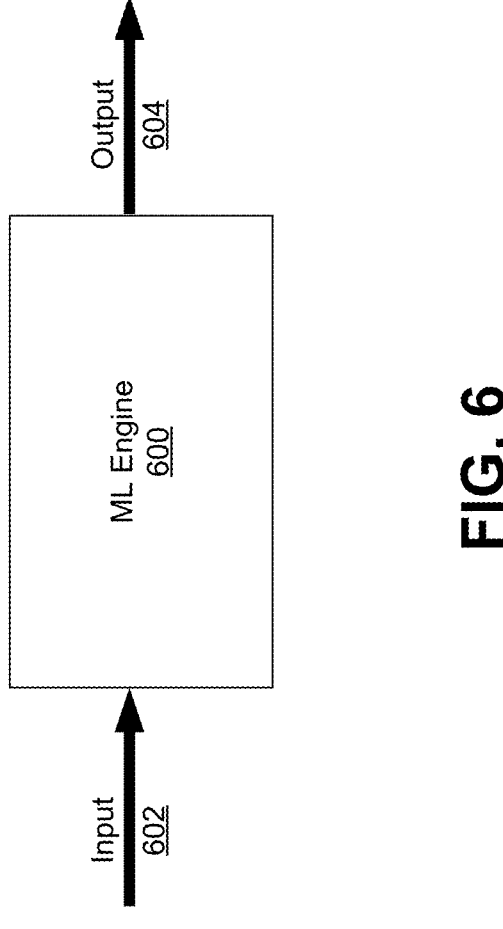
FIG. 6 is a block diagram illustrating a machine learning engine, in accordance with aspects of the present disclosure.

Increasingly ML (e.g., AI) algorithms (e.g., models or engines) are being incorporated into a variety of technologies including wireless telecommunications standards. According to aspects described herein, one or more ML models may trained using site-specific data to estimate or predict at least one characteristic associated with wireless communications between a UE and one or more network entities (e.g., one or more base stations), such as beam management predictions. FIG. 6 is a block diagram illustrating an ML engine 600 which can be trained using site-specific data to estimate or predict at least one characteristic associated with wireless communications between a UE and one or more network entities. As an example, one or more devices (e.g., UEs 104) in a wireless system may include ML engine 600. In some cases, ML engine 600 may be similar to neural network 500. In one example, ML engine 600 includes three parts, input 602 to the ML engine 600, the ML engine, and the output 604 from the ML engine 600. The input 602 to the ML engine 600 may be data from which the ML engine 600 may use to make predictions or otherwise operate on, such as site-specific data received from a base station (e.g., gNB) or obtained locally by a device (e.g., UE) on which the ML engine 600 is deployed. As an example, an ML engine 600 configured to make beam management predictions for selecting an RF beam may take, as input 602, data regarding current RF conditions, location information, network load, etc. As another example, data related to packets sent to a UE, along with historical packet data may be input 602 to an ML engine 600 configured to predict channel conditions for a UE (e.g., for CSI or CSF purposes). In some cases, the output 604 may be predictions or other information generated by the ML engine 600 and the output 604 may be used to configure a wireless device, adjust settings, parameters, modes of operations, etc. Continuing the previous examples, the ML engine 600 configured to select an RF beam may output 604 a RF beam or set of RF beams that may be used. Similarly, the ML engine 600 configured to predict channel conditions for the UE may output CSI or CSF for transmission to a base station.

While the principles disclosed herein relate to AI/ML models and use cases include generally beam management for wireless communication, the principles can also apply to any AI/ML model application in which an estimation or a prediction is to be made in connection with wireless communications between one or more UEs and/or one or more base stations.

With respect to beam management, a 4G/LTE UE may periodically monitor a radio link between the UE 104 and a network entity (e.g., an eNodeB (eNB)) to obtain the channel quality of its serving eNB. Based on measurements (e.g., power measurements, such as RSSI, RSRP, etc.) of the radio link, the UE 104 may determine whether the network is able to send communications to and receive communications from the UE 104 with an acceptable link quality. If the link quality is found too low based on a threshold (e.g., by comparing the power measurements to a minimum power threshold), the UE 104 may report a radio link failure (RLF) and trigger a higher-layer reconnection process. The reconnection process may include initiating a new cell re-selection procedure, which is more time consuming and hence results in a drop in the overall data rate.

With the advancement of 5G/New Radio (NR) into the mmWave spectrum, where hybrid beamforming may be used at both a base station and a UE, managing the network may become more complicated. On the other hand, a highly directional beamforming architecture with a larger number of antenna elements may be advantageous for achieving higher data rates. Certain procedures may be useful for a UE to establish a connection with a network entity and maintain the link even in mobility scenarios.

The use of mmWave enables directional communication with a larger number of antenna elements and provides an additional beamforming gain, which compensates for propagation loss. However, directional links may require precise alignment of beams at a base station 102 (e.g., gNB) and UE 104. The alignment requirement introduces the need for efficient management of beams where UE 104 and gNB 102 regularly identify the optimal beams for communication.

Use cases for 5G/NR, such as enhanced mobile broadband (eMBB), ultra-reliable and low latency communication (URLLC), and massive machine type communications (mMTC) will need technical innovations, and 5G beam management may be an advantageous tool for such use cases. 3GPP has defined a set of beam management procedures for 5G/NR that are applicable for both modes of operation: (1) Idle mode; and (2) Connected mode. Idle mode refers to when a UE does not have active data transmission. An idle mode procedure may be used when a UE is attempting to connect to a network for the first time while switching on or reinitiating connection after waking up. Beam management in idle mode may help in establishing a directional initial access. The connected mode refers to when active data exchange is taking place between the UE 104 and base station 102 (e.g., gNB) and the UE 104 is moving within the cell. In the connected mode, there may be a high chance of signal deteriorating rapidly due to the characteristics of mmWave, so managing the beam in real time can help in maintaining a healthy link.

Beam management may use several components and is a set of Layer 1 (PHY) and Layer 2 (MAC) procedures to establish and retain an optimal beam pair for good connectivity. A beam pair includes a transmit beam and a corresponding receive beam in one link direction between a UE 104 and the network (e.g., a gNB 102).

In some cases, before a UE 104 can communicate with the network, the UE 104 can perform cell search and selection procedures and obtain initial cell synchronization and system information. For example, the UE 104 can acquire frame synchronization, determine the cell identity, and decode the master information block (MIB) and system information block (SIB1).

In the case of a multi-antenna system that transmits multiple beams, detecting the beams from the network entity (e.g., gNB 102) may be a part of the initial procedure where the UE 104 normally detects the beams in a search space. A UE attach procedure can include the gNB sending a burst of beams to the UE 104 and the UE performing a measurement of a "set B" of beams and from the sweep and measurement of the set B, the UE 104 can determine a best beam as part of the beam management procedure. Once the best beam is determined, the UE 104 can receive a random access channel (RACH) allocation to communicate with the gNB 102.

Beam sweeping may be used during initial access by UE 104 to determine the best beam. For example, a gNB 102 may transmit beams in multiple directions, such as in a burst at regular defined intervals. Whenever a UE 104 is synchronizing with the network, the UE 104 can analyze the synchronization signal block (SSB) and extract one or more of the following: (1) Primary synchronization signal (PSS): which may include one of three possible sequences and provides timing estimate; (2) secondary synchronization signal (SSS): which may include one of 336 possible sequences and provides cell ID (one of 3*336=1008); and/or (3) Physical broadcast channel (PBCH) and demodulation reference signal (DMRS): which may include the MIB and includes basic information to take the next step, which is to decode the SIB-1.

A single SS block may span a number of OFDM symbols (e.g., four OFDM) symbols in the time domain and a number of subcarriers (e.g., 240 subcarriers) in the frequency domain (e.g., 20 resource blocks). Each SS block corresponds to a specific beam, beamformed in a different direction. A group of SS blocks form one SS burst set that spans a time window, such as a 5 ms window. The SS burst is repeated periodically with a period, such as a period of 20 ms.

A UE 104 may measure the beam strength by measuring received signal power, such as RSRP. RSSI, etc. For example, in idle mode, the power may be based on synchronization signals, and in connected mode, the power may be based on the channel state information reference signal (CSI-RS) in downlink and sounding reference signal (SRS) in uplink. The UE may searche for the best beam periodically using the predefined threshold criteria (e.g., as defined or configured by the gNB) and identify the beam that has highest power (e.g., RSRP) relative to the threshold.

The UE 104 can transmit data or indicate a best beam to the gNB 102, which may be referred to as beam reporting. There are several ways or use cases related to how the UE 104 determines the best beam. For example, a spatial-domain downlink (DL) beam prediction approach may be performed, where a first set of beams (referred to as set A of beams) is determined via application of an AI/ML model from the measurement results of a second set of beams (referred to as a set B of beams). The set A is used for beam prediction in which a trained AI/ML model predicts which of set A would be the best beam to use for reporting. The wireless communication system 100 can measure a given set of beams (set B or a wide set of beams) and then the wireless communication system 100 may predict the best beams from the set A. Set A can be established or identified from the measurements across set B. Such a procedure can be referred to as wide-to-narrow beam prediction. The best channel state information-reference signal (CSI-RS) indexes through the wide beam measurements. In another aspect, there may be, for example, 64 beams and the system may measure 16 of those beams and extrapolate from the selected group of 16 the best beam from the 64 beams. In one example, the 16 beams (or any subset number) from the larger set of 64 beams (or other set number) may be selected randomly or may be selected to represent a spatially broad spectrum of the 64 beams (such as every $4^{th}$ beam, or beams focused on an area of the spectrum with expected better performance). Other selection protocol might apply including an AI/ML estimation or prediction of where in the spectrum of 64 beams the likely best beam might be selected.

There may be alternatives to the spatial-domain downlink (DL) beam prediction approach. One alternative is where set B is a subset of set A. Here, the wireless communication system 100 tries to determine set B out of the beams in set A via a fixed pattern or random pattern. In another alternative, set A and set B are different where, for example, set A consists of narrow beams and set B consists of wide beams. The wireless communication system 100 may in that case try and determine a QCL (quasi-co-located) relationship between set A and set B beams. The goal is to reduce the number of measurements. For both alternatives the system tries to measure a limited set of beams and predict on a larger set of beams.

In another case, a temporal DL beam prediction for set A can be used based on the historic measurement results of the set B of beams. The wireless communication system 100 tries to predict what is going to be the best beam in the next beam management instance, or in another aspect, the wireless communication system 100 tries to predict the beam measurements in the future.

The temporal DL prediction may also have alternatives as well. One alternative is where set A and set B are different where for example set A consists of narrow beams and set B consists of wide beams. In one alternative, the prediction is being performed both in the spatial domain and the temporal domain. The spatial domain and temporal domain prediction can be referred to as "spatial-plus" prediction. In another alternative, the set B may be a subset of set A and it may be problematic to determine how to determine set B out of the beams in set A. The wireless communication system 100 may not have an opportunity to determine with the spatial domain for determining the best CSI-RS index. The wireless communication system 100 may use the previous two or previous five SSB (synchronization signal block)-bursts (or some other number) and then try to determine the best narrow beam index. The system could provide just temporal indexing where set A and set B are the same. In one case, which is another alternative to temporal DL prediction, only in the time domain does the wireless communication system 100 see the set of beams in the past and then the wireless communication system 100 tries to predict the best beam from that same set of beams in the future.

A random access channel (RACH) is an uplink channel used during initial access or when mobile is out of sync with the network and needs to establish synchronization. For example, in idle mode, after the UE selected the beam, there may be one or more RACH intervals with a certain time and frequency offset for which the UE may transmit the RACH preamble. The UE may transmit a physical RACH (PRACH) preamble corresponding to the SS block for which the best beam was identified. There may be a one-to-one mapping between the received SS block and the transmitted RACH preamble. Using such techniques, the UE may report the best beam to the gNB. The network entity 102 (e.g., gNB) may configure the UE 104 to perform certain measurements and report results of the measurements, such as at a preconfigured interval. The process may be referred to as measurement reporting. In the connected mode, when the UE 104 is already connected with the gNB 102 and active data transfer is taking place, the UE 104 may report a selected beam through a measurement report to the gNB 102.

In the case of beam failure due to poor channel conditions, the beam recovery process is triggered to determine a new beam. In such cases, the UE 104 may monitor the reference signal and identify the beam failure once failure trigger conditions are met. The UE 104 may select a next best beam for sending in a random access (RA) preamble when the beam failure occurs on a particular beam. For example, if a first attempt at RA fails, the UE may sweep to another beam for another RA procedure. The RA preamble may be sent in the PRACH. The UE 104 may then receive a downlink resource allocation and an uplink grant on the physical downlink control channel (PDCCH). The AI/ML model data might be used in beam recovery as the prediction or output from the AI/ML model may include a best beam, a next best beam, and so forth. Thus, the AI/ML model can be used for beam recovery purposes as well.

Switching from one beam to another can also be referred to as intra-cell mobility or beam-level mobility. Beam switching is based on a trigger condition for a beam and the configured beam switching algorithm. Beam switching is applicable when the UE 104 is in connected mode and can be performed through L1/L2 procedures. On the other hand, handover is for inter-cell mobility and is an L3 procedure. Again, the AI/ML model can be used to apply or implement switching from one beam to another.

AI/ML models are typically trained using a large amount of data for a particular environment such as an indoor or an urban environment. In the various beam prediction implementations (e.g., spatial-domain DL beam prediction, temporal DL beam prediction, etc.), data for a particular environment, site or geographic location is used to train the AI/ML model. The physical, timing, or other characteristics of the environment are provided to the AI/ML model as inputs and the output of the model can be the selected beam(s) (e.g., best beam, next-best beam, etc.) to use for wireless communication between a UE 104 and the gNB 102. Then, the UE 104 receives the AI/ML model and can use the model to make predictions for beam management (or other characteristics, such as channel measurements for CSI or CSF purposes) according to the trained environment. The UE 104 can then move to another site or another geographic location with different physical characteristics, or the characteristics of an existing site in which the UE 104 is located may change over time (e.g., at night versus during the day). However, the AI/ML model would not be trained for the characteristics of the new site or geographic location. The wireless communication system 100 may then need to monitor the AI/ML model for poor performance in one scenario. The monitoring can be performed on any device such as the gNB 102 and/or the UE 104. The performance may change based on environmental changes due to the new site or changes in an existing site, which may impact the channel characteristics between the UE 104 and gNB 102 (or other gNB). For example, the environment might change based on the time of day and other entities or UE's around the monitored UE 104.

The wireless communication system 100 may deploy model monitoring in order to monitor (e.g., from the gNB) the UE AI/ML model. In the prediction instances, the UE 104 will estimate or determine a prediction, and then there is an actual measurement that the UE 104 can make and a comparison can be made between the actual measurement and the prediction from the AI/ML model. There is an inference error between a measurement and the prediction of the proper beam from the AI/ML model. If there is a threshold met with respect to the error calculation, then the gNB 102 can determine that the model is not performing well. A number of different actions can be taken if the model monitoring determines that the performance of the ML model does not meet a threshold. For example, the model may be deactivated or disabled for use and another model or standard (non-ML) means may be used to determine the best beam. However, such approaches have disadvantages, such as requiring multiple ML models to be trained or requiring more compute resources.

As noted previously, another approach disclosed herein involves a UE 104 obtaining a site-specific dataset which can provide data to allow the UE (or a server associated with the UE) to fine-tune (e.g., via online adaptation) an existing ML model of the UE 104. For instance, the site-specific data may be obtained from a base station 102 (e.g., a gNB) and/or may be measured locally by the UE 104. The amount of site-specific data transmitted for fine tuning the model is, relative to the original training data, much less and thus less of a burden on the wireless interface. The wireless communication system 100 can thus initiate a retraining (e.g., fine-tuning or online adaptation) process for the ML model so that the UE 104 can adapt in circumstances where the model is not performing. As noted above, the UE 104 may need to perform such adaptation when the UE 104 move to a new geographical location, based on a time of day or other circumstances (where the same location that the UE 104 is in has different physical characteristics that cause the model to drop in its performance), or for other reasons.

The UE side ML model for estimating or predicting characteristics associated with wireless communication with the gNB 102 can be needed in various scenarios. For example, a gNB 102 may send a reference signal (RS) at a certain time frame or frequency, such as every 10 seconds or every 20 seconds. The RS can be used by the UE 104 to determine or select the best beam to use for wireless communication. However, sending that signal requires a certain amount of bandwidth. Therefore, if the UE 104 has an ML model used to predict the proper or best beam to use, then the gNB 102 may extend the frequency or timing of when the RS needs to be sent, such as every 40 seconds or every 60 seconds. Thus, the systems and techniques described herein can improve the bandwidth of the system 100. The UE 104 can then rely on predictions based on the training of the ML model between the receipt of RSs. Power savings can also be achieved by using the ML model where it is costly from a power perspective for the UE 104 to perform or gather its own measurements for choosing the best beam. In one scenario, rather than doing measurements every 20 ms, the UE 104 can perform measurements every 40 ms or 60 ms.

Other use cases beyond those discussed above include position-assisted beam management. In such cases, the input to the ML model may be position information of the UE (e.g., location coordinates, orientation, or other location or position information indicating a location of the UE), and the output of the ML model is a best beam (e.g., the best downlink (DL) beam). As a UE 104 moves across or around the environment (e.g., around a gNB), such as in a circular pattern, the best beam that can be used for that UE 104 is correlated with the position of the UE 104.

ML-assisted CSI or CSF is another example use case in which the systems and techniques for ML model adaptation based on site-specific data described herein can be applied. For example, a first ML model (e.g., an ML-based encoder) at a UE 104 may perform compression of CSI feedback (or CSF) (e.g., to generate a latent representation of the CSI/CSF) and a second ML model (e.g., an ML-based decoder) at a gNB 102 may perform reconstruction of the compressed CSI-RS feedback. The UE 104 may update the first ML model based on site-specific data, as described herein.

The site-specific adaptation or fine-tuning may generally be applied to a trained neural network or ML model that was trained offline and is deployed on the UE 104. The UE 104 may be in a first environment which corresponds to the original offline training of the ML model. The first environment may be a geographic location such an indoor setting or an outdoor urban setting. The UE 104 may then move to new site (corresponding to a new geographic location), and based on a triggering condition, the UE 104 may request the gNB 102 to send a "site-specific" dataset to the UE 104 or the UE 104 may locally collect information or data making up a site-specific dataset. The site-specific dataset can be used by the UE 104 to fine-tune or adapt the ML model to the new environment.

In some cases, the UE 104 can conduct performance monitoring to detect whether the ML model is not performing properly or to a certain threshold performance level, which can trigger the UE 104 to request site-specific dataset from the gNB 102 or to locally determine the site-specific data. For example, upon determining that the performance of the ML model falling below the threshold performance level (e.g., a probability output by the ML model is below a threshold probability representing the threshold performance level), the UE 104 may send a request to the gNB 102 for the site-specific dataset to be sent to the UE 104. In one illustrative example of a metric, in prediction instances (which refer to instances over which the UE 104 is scheduled to or supposed to predict beam measurements), the gNB 102 can send some auxiliary reference signals to enable the UE 104 to compare actual beam measurements to predicted values. The difference between 'predicted parameters' and 'measured parameters' is referred to as 'inference error'. If the inference error is larger than a threshold (that can be configured by the gNB 102) for more than a threshold number of times during a time window, the AI/ML model may not be performing well and should be deactivated or re-trained.

The site-specific dataset can relate to the inputs to the ML model and the outputs or the labels of the ML model. The site-specific dataset can be gathered at the gNB from a number of different UEs 104 that have historically been present in the geographic location corresponding to the site at which the UE is located. The gNB 102 can log the data for UEs 104 that have been in its cell or can generate different sets for different use cases (e.g., spatial-domain prediction, temporal prediction, etc.). The UE 104 can then request the site-specific dataset and can then perform online adaptation or fine-tuning of the ML model. For example, the site-specific dataset may be small relative to the larger dataset used for the initial off-line training of the ML model. The smaller dataset can be downloaded or transmitted to the UE 104 and then used to adapt the ML model on the UE 104. The request can include specifics for the requested dataset including at least one of the ML models, the labels, the dataset size that the UE wants and so forth. For example, if the level of degradation of the ML model might meet the threshold but may not be large and so only a small amount of possible data of the datasets might be needed for fine-tuning. For beam management use cases, the site-specific dataset can include at least one of temporal, spatial, and positioning-assisted beam prediction data. For CSI/CSF based use case, the site-specific data can include channel conditions as input data and correctly-predicted beams as labeled output data for training purposes. Based on the adaptation of the ML mode, the performance of the ML model can be improved for that particular environment.

The "site" could be a geographic location covered by a serving cell being served by a gNB 102 where the UE 104 is active in the cell. The wireless communication system 100 may also include a portion of a cell or intra-site or inter-site variations. It could be a hotspot deployment or other type of deployment. In some cases, there may be UMi (urban micro) or a UMa (urban macro) deployment. In some cases, there may be variations within the same "site" such as a different season or a different time of day which can cause an impact in the performance of the ML model. But generally, the "site" is the geographic location of the UE 104. One example if an intra-site generalization of the concept is where the performance of the UE model might change from time to time even though the UE 104 has not moved or is generally at the same geographic location. For example, an ML model might be trained for a location but for a certain season like the summer. The physical characteristics of the site might change in the winter and cause the performance of the ML model to degrade and thus need adaptation. The ML model might be trained for daytime use but then the UE 104 might be used at night when the physical characteristics of the location are different. These are examples of intra-site variations where site-specific datasets can be received to fine tune the model for that site.

With respect to positioning-assisted prediction, a gNB 102 may have tagged a position of the UE 104 with the best DL beams for the UE 104 in that position. The gNB 102 may continue collecting the data from various UEs 104. The data may also include different orientations of the UEs 104 at different times. The best gNB beam might change based on an orientation of the UE 104. Thus, other auxiliary input to the ML models can include information other than position of the UEs. However, in one aspect, when the UE 104 determines that the ML model should be adapted or fine tuned, the UE 104 can request the site-specific dataset (which can be of a certain size). Once the UE 104 receives the site-specific dataset, the UE 104 can perform on-line adaptation or fine-tuning of the ML model. The position in that case can be the input and the selected beam can be the label or output. For instance, the UE 104 may receive the input and the labels or outputs, and the UE 104 can perform a supervised learning problem in which the input and labels can be used to fine tune the ML model. In one example, a label or output can be compared to the predicted output generated by the ML model based on the input, and a loss can be determined. The results of the loss can be used to perform backpropagation to tune parameters (e.g., weights, biases, etc.) of the ML model.

In general, the site-specific dataset is the same across the cell being served by the gNB 102. However, there may be scenarios where different datasets might apply to different areas within a cell covered by a gNB 102 and the specific location of the UE 104 might be used to select a position-based site-specific dataset from a group of site-specific datasets.

FIG. 7A is a flow diagram illustrating a method 700. An example method 700 of wireless communications at a first network entity includes one or more of obtaining site-specific data associated with a geographic location (702) and adapting, at the first network entity, a machine learning model based on the site-specific data to generate an updated machine learning model estimating or predicting of at least one characteristic associated with wireless communications between the first network entity and one or more network entities (704). The first network entity can be located in the geographic location. The method can also include transmitting an indication associated with adapting the machine learning model based on the site-specific data (706). The indication, in one example, can identify that the fine-tuning of the machine learning model is complete and an updated machine learning model is being used for wireless communication.

The method 700 can further include determining, at the first network entity using the updated machine learning model, one or more estimations or predictions of the at least one characteristic associated with wireless communication between the first network entity and other network entities based on data received by the first network entity at the geographic location.

In another aspect, the method 700 can further include transmitting, from the first network entity to a second network entity, a request for the site-specific data. Transmitting the request for the site-specific data can be triggered based on at least one of a location of the first network entity in the geographic location or the first network entity moving to the geographic location. The transmitting of the request for the site-specific data can further be triggered based on a performance change in the machine learning model.

The method 700 can further include monitoring, at the first network entity, a performance of the machine learning model. In one case, the transmitting of the request for the site-specific data can be triggered based on the performance being below a threshold level. A change in the performance of the model can be based on any number of factors include a change in geographic location or a change in the physical surroundings or characteristics of the location.

The estimation or the prediction can be associated with wireless communication between the first network entity and the second network entity. In one aspect, the site-specific data can be obtained by the second network entity from multiple user equipment (UE) in communication with the second network entity. The site-specific data can be aggregated data from a plurality of UEs 104 or may be processed in some way to prepare the data for transmission to a respective UE104.

The request can include at least one of a request for inputs to the machine learning model, a request for labels for training the machine learning model using supervised learning, or a request for a size of the site-specific data. The request further can include position information associated with the first network entity, and wherein the site-specific data is based on the position information.

The first network entity can include a user equipment (UE) 104 and the second network entity can include a base station 102. The site-specific data can include at least one of temporal beam prediction data, spatial beam prediction data, or positioning-assisted beam prediction data. The site-specific data can be based on data from multiple UEs 104 associated with the geographic location. In one specific example, the machine learning model is trained for beam prediction. The site-specific data may be associated with physical characteristics of the geographic location which can be spatial and/or temporal, such as changing characteristics of the location.

The site-specific data can include at least one of position data as one or more inputs for adapting the machine learning model, beam data as one or more labeled outputs for adapting the machine learning model, or orientation data for adapting the machine learning model. In one aspect, prior to adapting the machine learning model, the machine learning model is trained off-line using a training dataset which in general is larger than the amount of site-specific data that would be transmitted to the UE 104 for fine-tuning its model.

An apparatus for wireless communication can include at least one memory and at least one processor coupled to the memory and configured to obtain site-specific data associated with a geographic location, adapt, at the first network entity, a machine learning model based on the site-specific data to generate an updated machine learning model for estimating or predicting at least one characteristic associated with wireless communications between the apparatus and one or more network entities and transmit an indication associated with adapting the machine learning model based on the site-specific data.

FIG. 7B is a flow diagram illustrating a method 710 for wireless communication. An example method 710 of wireless communications can include one or more of transmitting an indication indicating, by a UE (e.g., UE 104 shown in FIG. 1) and to a network entity (e.g., a base station or gNB 102 shown in FIG. 1), a capability of being able to update a trained AI/ML model (e.g., model 500 shown in FIG. 5) (712), in response to receiving the indication, transmitting site-specific data associated with the trained AI/ML model (714), and transmitting, from the UE 104 and to the network entity 104, an indication associated with adapting the AI/ML model based on the site-specific data (716). The ability to update the trained AI/ML model can include fine-tuning the AI/ML model. The site-specific data can include inputs and/or outputs (or labels) of the AI/ML model. A dataset of the site-specific data can be used by the UE 104 to fine-tune the AI/ML model. Note that the additional training or fine-tuning of the AI/ML model does not have to happen on any particular device. The UE 104 can update the AI/ML model via a server associated with a UE/Chipset/OEM vendor. The site-specific data can be sent by way of example over a RRC/MAC-CE (e.g., radio resource control/medium access control-control element). The RRC/MAC-CE represents an example MAC (medium access control) structure that can be used to carry control information.

The indication associated with adapting the AI/ML model based on the site-specific data can include, by way of example, an indication that the fine-tuning is complete and that the updated model is now being used for wireless communication.

The transmitting of the site-specific data in one example can be from a network entity such as a gNB 102 to the UE 104. The UE 104 can use the site-specific data to update its AI/ML model on the UE 104 or the UE 104 may update the AI/ML model via a separate server with the site-specific data being transmitted over a communication channel for sending control data. In this regard, the apparatus that is defined can include both a network entity such as a gNB 102 and the UE 104. In one aspect, the method can be defined to be performed by either a user equipment or a network entity. The steps of the method may be performed from the standpoint of either the UE 104 or the network entity 203. For example, if the method is performed just from the standpoint of the UE 104, the method can include indicating, by a UE (e.g., UE 104 shown in FIG. 1) and to a network entity (e.g., a base station or gNB 102 shown in FIG. 1), a capability of being able to update a trained AI/ML model (e.g., model 500 shown in FIG. 5), in response to the indicating, receiving, at the UE 104 and from the network entity 102, site-specific data associated with the trained AI/ML model, and transmitting, from the UE 104 and to the network entity 102, an indication associated with adapting the AI/ML model based on the site-specific data.

An apparatus for wireless communication can include: at least one memory; and at least one processor coupled to the memory and configured to: indicate, by a UE (e.g., UE 104 shown in FIG. 1) and to a network entity (e.g., a base station or gNB 102 shown in FIG. 1), a capability of being able to update a trained AI/ML model (e.g., model 500 shown in FIG. 5), in response to the indicating, transmit site-specific data associated with the trained AI/ML model, and transmit, from the UE 104 and to the network entity 102, an indication associated with adapting the AI/ML model based on the site-specific data. The ability to update the trained AI/ML model can include fine-tuning the AI/ML model. The site-specific data can include inputs and/or outputs (or labels) of the AI/ML model. A dataset of the site-specific data can be used by the UE 104 to fine-tune the AI/ML model. Note that the additional training or fine-tuning of the AI/ML model does not have to happen on any particular device. The UE 104 can update the AI/ML model via a server associated with a UE/Chipset/OEM vendor. The site-specific data can be sent by way of example over a RRC/MAC-CE (e.g., radio resource control/medium access control-control element). The RRC/MAC-CE represents an example MAC (medium access control) structure that can be used to carry control information.

The indication associated with adapting the AI/ML model based on the site-specific data can include, by way of example, an indication that the fine-tuning is complete and that the updated model is now being used for wireless communication.

The transmitting of the site-specific data in one example can be from a network entity such as a gNB 102 to the UE 104. The UE 104 can use the site-specific data to update its AI/ML model on the UE 104 or the UE 104 may update the AI/ML model via a separate server with the site-specific data being transmitted over a communication channel for sending control data. In this regard, the apparatus that is defined can include both a network entity such as a gNB 102 and the UE 104. In another aspect, the apparatus may include just one of a user equipment or a network entity and the operations that are performed are all from the standpoint of either the user equipment or the network entity. For example, if the apparatus is a UE 104, then the UE 104 can be configured to: indicate, by the UE (e.g., UE 104 shown in FIG. 1) and to a network entity (e.g., a base station or gNB 102 shown in FIG. 1), a capability of being able to update a trained AI/ML model (e.g., model 500 shown in FIG. 5), in response to the indicating, receive, at the UE 104 and from the network entity 102, site-specific data associated with the trained AI/ML model, and transmit, from the UE 104 and to the network entity 102, an indication associated with adapting the AI/ML model based on the site-specific data.

FIG. 8A is a flow diagram illustrating a method 800 for performing wireless communication at a network entity. A method 800 in one aspect occurs from the standpoint of the gNB 102. The method 800 includes obtaining site-specific data associated with a geographic location (802) and transmitting to a user equipment (UE) 104 or mobile device, the site-specific data (804) and receiving from the UE 104, an indication associated with adapting a machine learning model at the UE 104 based on the site-specific data, the machine learning model for estimating or predicting at least one characteristic associated with wireless communications between the network entity and the UE 104. The UE 104 can adapt a machine learning model based on the site-specific data for estimating or predicting at least one characteristic associated with wireless communications between the network entity and the UE 104.

An apparatus for wireless communication can include at least one memory and at least one processor coupled to the memory and configured to obtain site-specific data associated with a geographic location, transmit to a user equipment (UE) 104 or mobile device, the site-specific data and receive, from the UE 104, an indication associated with adapting a machine learning model at the UE based on the site-specific data, the machine learning model for estimating or predicting at least one characteristic associated with wireless communications between the network entity and the UE.

In some examples, the processes described herein (e.g., method 800 and/or other process described herein) may be performed by a computing device or apparatus (e.g., a UE 104 or a base station 102). In another example, the process 800 may be performed by the UE of the UEs 104 of FIG. 1. In another example, the process 800 may be performed by a base station of the base stations 102 of FIG. 1.

FIG. 8B is a flow diagram illustrating a method 810 for performing wireless communication. The method 810 in one aspect occurs from the standpoint of the UE 104. The method 810 includes obtaining, at a user equipment (UE) 104 and from a network entity, site-specific data associated with a geographic location (812) and adapting, at the UE 104, a machine learning model based on the site-specific data to generate an updated machine learning model for estimating or predicting at least one characteristic associated with wireless communications between the UE 104 and the network entity (814). In one aspect, the network entity can be the gNB 102.

Figure 8C:
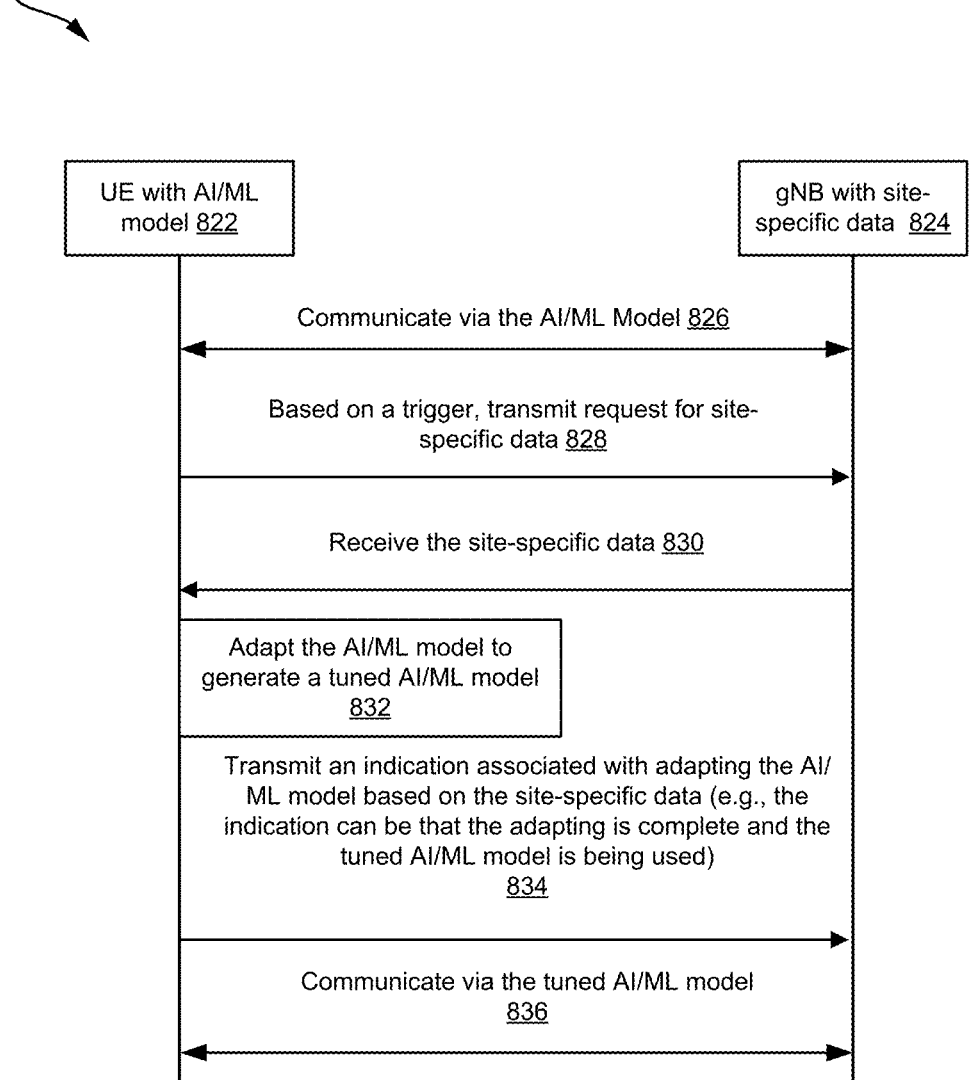
FIG. 8C illustrates a communication flow between a UE and a gNB with respect to requesting and receiving site-specific data for fine tuning an AI/ML model on the UE.

FIG. 8C illustrates an example exchange of communication 820 between a UE 822 having an AI/ML model and a gNB 824 having site-specific data. A process flow for wireless communications can include communicating between a first network entity such as the UE 822 and a second network entity such as the gNB 824 utilizing a machine learning model operating on the first network entity (826). Based on a triggering condition, transmitting a request, from the first network entity, that the second network entity provide site-specific data to the first network entity (828), receiving, based on the request and from the second network entity, the site-specific data (830), adapting, on the first network entity and based on the site-specific data, the machine learning model to generate a tuned machine learning model (832), transmitting an indication associated with adapting the AI/ML model based on the site-specific data (i.e., that the adapting of the machine learning model is complete and that the first network entity is resuming communication using the tuned machine learning model) (834) and communicating between the first network entity and the second network entity utilizing the tuned machine learning model operating on the first network entity (836).

The transmitting of the indication can occur through a MAC-Control Element/DCT signal. The triggering condition can be for example a result of model performance monitoring.

Figure 9:
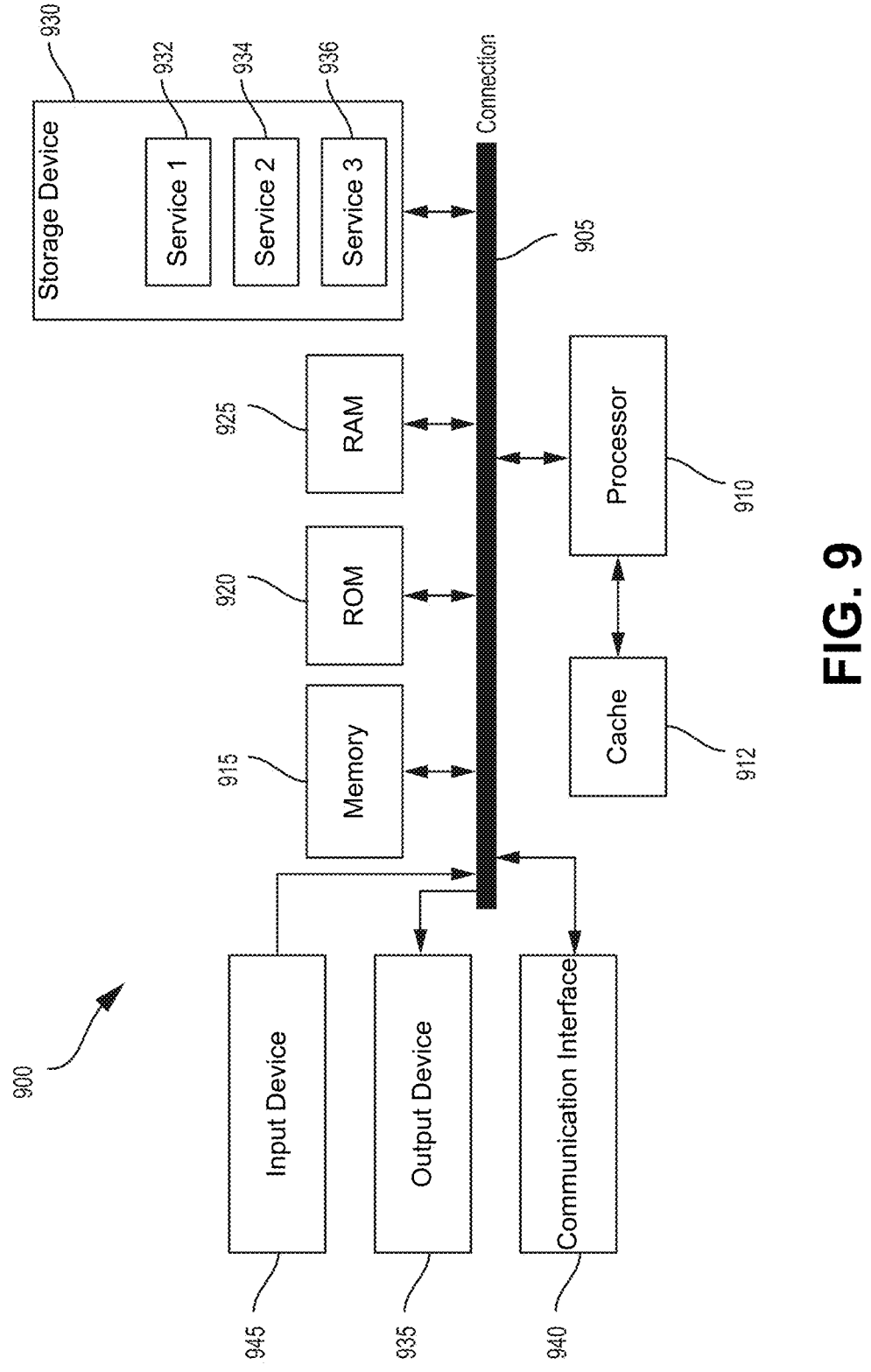
FIG. 9 is a diagram illustrating an example of a system for implementing certain aspects of the present technology.

FIG. 9 is a diagram illustrating an example of a system for implementing certain aspects of the present technology. In particular, FIG. 9 illustrates an example of computing system 900, which may be for example any computing device making up an internal computing system, a remote computing system, a camera, or any component thereof in which the components of the system are in communication with each other using connection 905. Connection 905 may be a physical connection using a bus, or a direct connection into at least one processing unit 910 (which can also be called a processor), such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example computing system 900 includes at least one processing unit (CPU or processor) 910 and connection 905 that communicatively couples various system components including system memory 915, such as read-only memory (ROM) 920 and random access memory (RAM) 925 to the at least one processing unit 910. Computing system 900 may include a cache 912 of high-speed memory connected directly with, in close proximity to, or integrated as part of at least one processing unit 910.

The at least one processing unit 910 may include any general purpose processor and a hardware service or software service, such as services 932, 934, and 936 stored in storage device 930, configured to control the at least one processing unit 910 as well as a special-purpose processor where software instructions are incorporated into the actual processor design. The at least one processing unit 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the at least one processing unit 910, the code causes the system to perform a function. In some embodiments, a hardware service that performs a particular function may include the software component stored in a computer-readable medium in connection with the necessary hardware components, such as the at least one processing unit 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Note that there are cases where the AI/ML model may not be on the UE 104 but might be configured on the gNB 102 and the AI/ML model might rely on reports from the UE 104 for input data. Measurements might be sent to the gNB 102 where prediction occurs. Such as scenario is covered in this disclosure.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A method of wireless communications at a first network entity, the method comprising: obtaining site-specific data associated with a geographic location; adapting, at the first network entity, a machine learning model based on the site-specific data to generate an updated machine learning model for estimating or predicting at least one characteristic associated with wireless communications between the first network entity and one or more network entities and transmitting an indication associated with adapting the machine learning model based on the site-specific data.

Aspect 2. The method of Aspect 1, wherein the first network entity is located in the geographic location.

Aspect 3. The method of any of Aspects 1 or 2, further comprising: determining, at the first network entity using the updated machine learning model, one or more estimations or predictions of the at least one characteristic associated with wireless communications between the first network entity and one or more network entities based on data received by the first network entity at the geographic location.

Aspect 4. The method of any of Aspects 1 to 3, further comprising: transmitting, from the first network entity to a second network entity, a request for the site-specific data.

Aspect 5. The method of any Aspects 1 to 4, wherein transmitting the request for the site-specific data is triggered based on at least one of a location of the first network entity in the geographic location or the first network entity moving to the geographic location.

Aspect 6. The method of any of Aspects 1 to 5, wherein transmitting the request for the site-specific data is triggered based on a performance change in the machine learning model.

Aspect 7. The method of any of Aspects 1 to 6, further comprising: monitoring, at the first network entity, a performance of the machine learning model, wherein transmitting the request for the site-specific data is triggered based on the performance being below a threshold level.

Aspect 8. The method of any of Aspects 1 to 7, wherein the estimating or the predicting is associated with wireless communication between the first network entity and the second network entity.

Aspect 9. The method of any of Aspects 1 to 8, wherein the site-specific data is obtained by the second network entity from multiple user equipment (UE) in communication with the second network entity.

Aspect 10. The method of any of Aspects 1 to 9, wherein the request comprises at least one of a request for inputs to the machine learning model, a request for labels for training the machine learning model using supervised learning, or a request for a size of the site-specific data.

Aspect 11. The method of any of Aspects 1 to 10, wherein the request further comprises position information associated with the first network entity, and wherein the site-specific data is based on the position information.

Aspect 12. The method of any of Aspects 1 to 11, wherein the first network entity comprises a user equipment (UE).

Aspect 13. The method of any of Aspects 1 to 12, wherein the second network entity comprises a base station.

Aspect 14. The method of any of Aspects 1 to 13, wherein the site-specific data comprises at least one of temporal beam prediction data, spatial beam prediction data, or positioning-assisted beam prediction data.

Aspect 15. The method of any of Aspects 1 to 14, wherein the site-specific data is based on data from multiple user equipment (UE) associated with the geographic location.

Aspect 16. The method of any of Aspects 1 to 15, wherein the machine learning model is trained for beam prediction.

Aspect 17. The method of any of Aspects 1 to 16, wherein the site-specific data is associated with physical characteristics of the geographic location.

Aspect 18. The method of any of Aspects 1 to 17, wherein the site-specific data comprises at least one of position data as one or more inputs for adapting the machine learning model, beam data as one or more labeled outputs for adapting the machine learning model, or orientation data for adapting the machine learning model.

Aspect 19. The method of any of Aspects 1 to 18, wherein, prior to adapting the machine learning model, the machine learning model is trained off-line using a training dataset.

Aspect 20. The method of any of Aspects 1 to 19, wherein the indication identifies that the adapting is complete and that the updated machine learning model is being used for the wireless communication Aspect 21. An apparatus for wireless communications, comprising: at least one memory; and at least one processor coupled to the at least one memory and configured to perform operations according to any of Aspects 1 to 20.

Aspect 22. A method for performing wireless communication, the method comprising: obtaining, via a first network entity, site-specific data associated with a geographic location; and transmitting, from the first network entity and to a second network entity, the site-specific data, wherein a machine learning model is adapted based on the site-specific data for estimating or predicting at least one characteristic associated with wireless communications between the first network entity and one or more network entities.

Aspect 23. An apparatus for wireless communication comprising: at least one memory; and at least one processor coupled to the memory and configured to: obtain, via a first network entity such as a gNB, site-specific data associated with a geographic location; transmit, from the first network entity, to a second network entity such as a UE or mobile device, the site-specific data, wherein a machine learning model is adapted based on the site-specific data for estimating or predicting at least one characteristic associated with wireless communications between the first network entity and one or more network entities; and transmit an indication associated with adapting the machine learning model based on the site-specific data.

Aspect 24. A method of wireless communications comprising one or more of: indicating, by a UE and to a network entity, a capability of being able to update a trained AI/ML model, in response to the indicating, transmitting or receiving site-specific data associated with the trained AI/ML model, and transmitting, from the UE and to the network entity, an indication associated with adapting the AI/ML model based on the site-specific data.

Aspect 25. An apparatus for wireless communication comprising: at least one memory; and at least one processor coupled to the memory and configured to: indicate, by a UE and to a network entity, a capability of being able to update a trained AI/ML model, in response to the indicating, transmit or receive site-specific data associated with the trained AI/ML model, and transmit, from the UE and to the network entity, an indication associated with adapting the AI/ML model based on the site-specific data.

Aspect 26. A method for performing wireless communication at a network entity, the method comprising: obtaining site-specific data associated with a geographic location; transmitting to a user equipment (UE), the site-specific data; and receiving, from the UE, an indication associated with adapting a machine learning model at the UE based on the site-specific data, the machine learning model for estimating or predicting at least one characteristic associated with wireless communications between the network entity and the UE.

Aspect 27. An apparatus for wireless communication comprising: at least one memory; and at least one processor coupled to the at least one memory and configured to: obtain site-specific data associated with a geographic location; transmit to a user equipment (UE), the site-specific data; and receive, from the UE, an indication associated with adapting a machine learning model at the UE based on the site-specific data, the machine learning model for estimating or predicting at least one characteristic associated with wireless communications between the apparatus and the UE.

Aspect 28. A non-transitory computer-readable storage medium comprising instructions stored thereon which, when executed by at least one processor, causes the at least one processor to perform operations according to any of Aspects 1-20, 22, 24 and/or Aspect 26.

Aspect 29. An apparatus for wireless communications comprising one or more means for performing operations according to any of Aspects 1-20, 22, 24 and/or Aspect 26.

What is claimed is:

1. A method of wireless communications at a first network entity, the method comprising:

transmitting, from the first network entity to a second network entity, a request for site-specific data associated with a geographic location and a machine learning model of the first network entity, wherein the machine learning model is trained for beam prediction;

obtaining the site-specific data associated with the geographic location;

adapting, at the first network entity, the machine learning model for beam prediction corresponding to the geographic location, wherein the adapting is based on using beam prediction data of the site-specific data as labeled outputs to generate an updated machine learning model for estimating or predicting at least one characteristic associated with wireless communications between the first network entity and the second network entity; and transmitting an indication associated with adapting the machine learning model based on the site-specific data.

2. The method of claim 1, wherein the first network entity is located in the geographic location.

3. The method of claim 1, further comprising:

determining, at the first network entity using the updated machine learning model, one or more estimations or predictions of the at least one characteristic associated with wireless communications between the first network entity and one or more network entities based on data received by the first network entity at the geographic location.

4. The method of claim 1, wherein transmitting the request for the site-specific data is triggered based on at least one of a location of the first network entity in the geographic location or the first network entity moving to the geographic location.

5. The method of claim 1, wherein transmitting the request for the site-specific data is triggered based on a performance change in the machine learning model.

6. The method of claim 1, further comprising:

monitoring, at the first network entity, a performance of the machine learning model, wherein transmitting the request for the site-specific data is triggered based on the performance being below a threshold level.

7. The method of claim 1, wherein the estimating or the predicting is associated with wireless communication between the first network entity and the second network entity.

8. The method of claim 1, wherein the site-specific data is obtained by the second network entity from multiple user equipment (UE) in communication with the second network entity.

9. The method of claim 1, wherein the request comprises at least one of a request for inputs to the machine learning model, a request for labels for training the machine learning model using supervised learning, or a request for a size of the site-specific data.

10. The method of claim 1, wherein the request further comprises position information associated with the first network entity, and wherein the site-specific data is based on the position information.

11. The method of claim 1, wherein the first network entity comprises a user equipment (UE).

12. The method of claim 11, wherein the second network entity comprises a base station.

13. The method of claim 1, wherein the site-specific data comprises at least one of temporal beam prediction data, spatial beam prediction data, or positioning-assisted beam prediction data.

14. The method of claim 1, wherein the site-specific data is based on data from multiple user equipment (UE) associated with the geographic location.

15. The method of claim 1, wherein the site-specific data is associated with physical characteristics of the geographic location.

16. The method of claim 1, wherein the site-specific data comprises at least one of position data as one or more inputs for adapting the machine learning model, the beam prediction data as the labeled outputs for adapting the machine learning model, or orientation data for adapting the machine learning model.

17. The method of claim 1, wherein, prior to adapting the machine learning model, the machine learning model is trained off-line using a training dataset.

18. The method of claim 1, wherein the indication identifies that the adapting is complete and that the updated machine learning model is being used for the wireless communication.

19. An apparatus for wireless communications, comprising:

at least one memory; and at least one processor coupled to the at least one memory and configured to:

transmit, from the apparatus to a network entity, a request for site-specific data associated with a geographic location and a machine learning model of the apparatus, wherein the machine learning model is trained for beam prediction;

obtain the site-specific data associated with the geographic location;

adapt the machine learning model for beam prediction corresponding to the geographic location based on using beam prediction data of the site-specific data as labeled outputs to generate an updated machine learning model for estimating or predicting at least one characteristic associated with wireless communications between the apparatus and the network entity; and transmit an indication associated with adapting the machine learning model based on the site-specific data.

20. The apparatus of claim 19, wherein the apparatus is located in the geographic location.

21. The apparatus of claim 19, wherein the at least one processor is configured to:

determine, using the updated machine learning model, one or more estimations or predictions of the at least one characteristic associated with wireless communications between the apparatus and one or more network entities based on data received by the apparatus at the geographic location.

22. The apparatus of claim 19, wherein the at least one processor is configured to transmit the request for the site-specific data based on at least one of a location of the apparatus in the geographic location or the apparatus moving to the geographic location.

23. The apparatus of claim 19, wherein the at least one processor is configured to transmit the request for the site-specific data based on a performance change in the machine learning model.

24. The apparatus of claim 19, wherein the at least one processor is configured to:

monitor a performance of the machine learning model, wherein transmitting the request for the site-specific data is triggered based on the performance being below a threshold level.

25. The apparatus of claim 19, wherein the estimating or the predicting is associated with wireless communication between the apparatus and the network entity.

26. A method for performing wireless communication at a network entity, the method comprising:

receiving, from a user equipment (UE), a request for site-specific data associated with a geographic location and a machine learning model of the UE, wherein the machine learning model is trained for beam prediction;

obtaining the site-specific data associated with the geographic location;

transmitting, to the UE, the site-specific data; and receiving, from the UE, an indication associated with adapting the machine learning model for beam prediction corresponding to the geographic at the UE based on using beam prediction data of the site-specific data as labeled outputs to generate an updated machine learning model for estimating or predicting at least one characteristic associated with wireless communications between the network entity and the UE.

27. An apparatus for wireless communication comprising:

at least one memory; and at least one processor coupled to the at least one memory and configured to:

receive, from a user equipment (UE), a request for site-specific data associated with a geographic location and a machine learning model of the UE, wherein the machine learning model is trained for beam prediction;

obtain the site-specific data associated with the geographic location;

transmit, to the UE, the site-specific data; and receive, from the UE, an indication associated with adapting the machine learning model for beam prediction corresponding to the geographic at the UE based on using beam prediction data of the site-specific data as labeled outputs to generate an updated machine learning model for estimating or predicting at least one characteristic associated with wireless communications between the apparatus and the UE.

* * * * *